(12) United States Patent
Beaurepaire et al.

(10) Patent No.: US 11,341,847 B1
(45) Date of Patent: May 24, 2022

(54) METHOD AND APPARATUS FOR DETERMINING MAP IMPROVEMENTS BASED ON DETECTED ACCIDENTS

(71) Applicant: HERE Global B.V., Eindhoven (NL)

(72) Inventors: Jerome Beaurepaire, Berlin (DE); Leon Stenneth, Chicago, IL (US); Jeremy Michael Young, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/110,057

(22) Filed: Dec. 2, 2020

(51) Int. Cl.
*G08G 1/09* (2006.01)
*G08G 1/16* (2006.01)
*G08G 1/0969* (2006.01)

(52) U.S. Cl.
CPC .......... *G08G 1/091* (2013.01); *G08G 1/0969* (2013.01); *G08G 1/165* (2013.01)

(58) Field of Classification Search
CPC .......... B60W 2556/40; B60W 60/0059; G08G 1/091; G08G 1/0969; G08G 1/165
See application file for complete search history.

(56) References Cited

U.S. PATENT DOCUMENTS

| | | | |
|---|---|---|---|
| 6,246,933 B1 | 6/2001 | Bague | |
| 9,051,043 B1 | 6/2015 | Peeters et al. | |
| 9,235,687 B2 | 1/2016 | Wanami | |
| 9,734,721 B2 | 8/2017 | Stenneth | |
| 9,886,841 B1 | 2/2018 | Nave et al. | |
| 10,493,936 B1 | 4/2019 | Konrardy et al. | |
| 10,466,709 B2 | 11/2019 | Kurata et al. | |
| 10,909,782 B1* | 2/2021 | Natanzon | G07C 5/0841 |
| 11,094,148 B2* | 8/2021 | Sato | G07C 5/008 |
| 2009/0157255 A1* | 6/2009 | Plante | G07C 5/008 |
| | | | 701/33.4 |

(Continued)

FOREIGN PATENT DOCUMENTS

| | | |
|---|---|---|
| CN | 111311044 A | 6/2020 |
| WO | 2019049134 A1 | 3/2019 |

OTHER PUBLICATIONS

Bohm et al., "New Developments on EDR (Event Data Recorder) For Automated Vehicles", Research Article, published online Mar. 8, 2020, vol. 10, Issue 1, pp. 140-146.

(Continued)

*Primary Examiner* — Ryan W Sherwin
(74) *Attorney, Agent, or Firm* — Ditthavong, Steiner & Mlotkowski

(57) ABSTRACT

An approach is provided for determining map improvements based on detected accidents. The approach involves determining that a vehicle was involved in an accident. The approach also involves receiving a report indicating map data configured in the vehicle at a time of the accident. The approach further involves determining an association between the configured map data and the accident. The approach further involves performing one or more of the following operations: (1) transmitting the association and/or at least a portion of the configured map data to a database and/or a computing device; or (2) determining at least one map change to the configured map data based on the determined association, and transmitting the at least one map change to the vehicle, at least one other vehicle, the database, and/or the computing device.

20 Claims, 17 Drawing Sheets

(56) References Cited

U.S. PATENT DOCUMENTS

| | | | |
|---|---|---|---|
| 2015/0088335 A1* | 3/2015 | Lambert | H04L 67/10 |
| | | | 701/1 |
| 2016/0350298 A1* | 12/2016 | Ono | G07C 5/0808 |
| 2017/0113664 A1* | 4/2017 | Nix | B60T 7/12 |
| 2018/0225769 A1 | 8/2018 | Slusar et al. | |
| 2018/0292833 A1 | 10/2018 | You et al. | |
| 2019/0187723 A1 | 6/2019 | Tao et al. | |
| 2019/0197497 A1 | 6/2019 | Abari et al. | |
| 2019/0220011 A1* | 7/2019 | Della Penna | G06F 8/65 |
| 2019/0354838 A1 | 11/2019 | Zhang et al. | |
| 2020/0209848 A1 | 7/2020 | Mercep et al. | |
| 2020/0378780 A1 | 12/2020 | Beaurepaire et al. | |
| 2021/0081908 A1 | 3/2021 | Derouen | |
| 2021/0114580 A1 | 4/2021 | Hashimoto et al. | |

OTHER PUBLICATIONS

Ali et al., "Car Accident Detection and Notification System Using Smartphone", International Journal of Computer Science and Mobile Computing, IJCSMC, vol. 4, Issue. 4, Apr. 2015, p. 620-635.

Office Action for related U.S. Appl. No. 17/110,071, dated Feb. 1, 2022, 46 pages.

Office Action for related U.S. Appl. No. 17/110,065, dated Mar. 1, 2022, 27 pages.

* cited by examiner

200

220

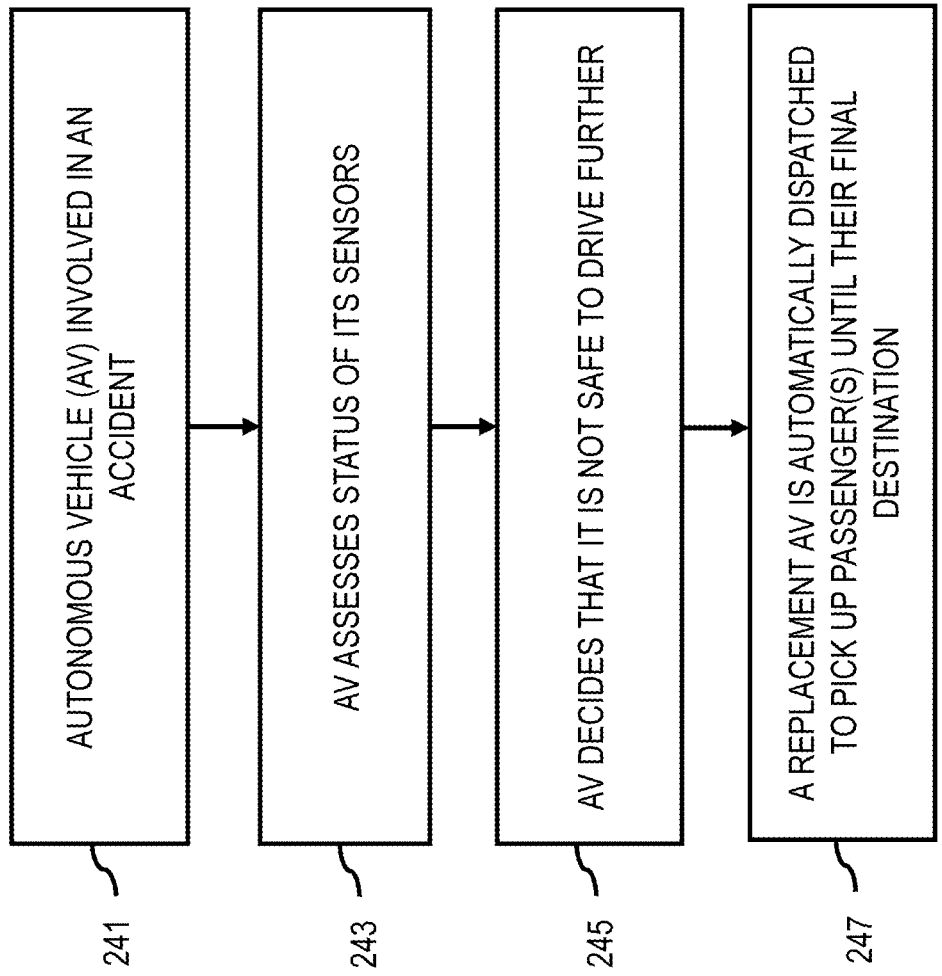

400

700

METHOD AND APPARATUS FOR DETERMINING MAP IMPROVEMENTS BASED ON DETECTED ACCIDENTS

BACKGROUND

There is increasing deployment of autonomous vehicles, highly-assisted driving (HAD) vehicles, etc. that at least partially drive or otherwise operate themselves without input from vehicle users or occupants. One area of development has been with respect to supporting such vehicles after accidents and/or sensor/system malfunctions. There can be many possible external and/or internal causes contributing to accidents and/or sensor/system malfunctions. Therefore, it will be beneficial to determine damages and the root cause(s) in order to determine how to handle the vehicle(s) and/or occupant(s), such as whether to stop the vehicle or drive the vehicle to a repair facility, whether to dispatch first responders and/or a replacement vehicle, etc. Although an autonomous or HAD vehicle may monitor sensors/systems during operation and/or an accident, assemble an malfunction/accident record for its manufacturer, owner, and/or occupants, and determine to call for first responders or a replacement vehicle, etc. The advanced driver-assistance systems (ADAS) do not investigate map-related errors that contribute to malfunctions/accidents to prevent future incidents. In addition, even when the vehicle is still drivable with malfunction(s) or after an accident, the ADAS do not offer solutions for continuing driving safely. Accordingly, service providers and manufacturers of autonomous or HAD vehicles face significant technical challenges to enabling mechanisms for investigating and reporting map-related errors contributing to sensor/system malfunctions and/or accidents, as well as mechanisms for continuing driving safely with malfunction(s) or after an accident.

SOME EXAMPLE EMBODIMENTS

Therefore, there are needs for approaches for evaluating, reporting, and handling an autonomous vehicle involving an accident and/or malfunction, particularly with respect to determining map data improvements based on detected accidents.

According to one or more example embodiments, a method comprises determining, by one or more processors, that a vehicle was involved in an accident. The method also comprises receiving, by the one or more processors, a report indicating map data configured in the vehicle at a time of the accident. The method further comprises determining, by the one or more processors, an association between the configured map data and the accident. The method further comprises performing, by the one or more processors, one or more of the following operations: (1) transmitting the association, at least a portion of the configured map data, or a combination thereof to a database, a computing device, or a combination thereof; or (2) determining at least one map change to the configured map data based on the determined association, and transmitting the at least one map change to the vehicle, at least one other vehicle, the database, the computing device, or a combination thereof.

According to another embodiment, an apparatus comprises at least one processor, and at least one memory including computer program code for one or more programs, the at least one memory and the computer program code configured to, with the at least one processor, to cause, at least in part, the apparatus to determine that a vehicle was involved in an accident. The apparatus is also caused to receive a report indicating map data configured in the vehicle at a time of the accident. The apparatus is further caused to determine an association between the configured map data and the accident. The apparatus is further caused to perform one or more of the following operations: (1) transmitting the association, at least a portion of the configured map data, or a combination thereof to a database, a computing device, or a combination thereof; or (2) determining at least one map change to the configured map data based on the determined association, and transmitting the at least one map change to the vehicle, at least one other vehicle, the database, the computing device, or a combination thereof.

According to another embodiment, a computer-readable storage medium carrying one or more sequences of one or more instructions which, when executed by one or more processors, cause, at least in part, an apparatus to determine that a vehicle was involved in an accident. The apparatus is also caused to receive a report indicating map data configured in the vehicle at a time of the accident. The apparatus is further caused to determine an association between the configured map data and the accident. The apparatus is further caused to perform one or more of the following operations: (1) transmitting the association, at least a portion of the configured map data, or a combination thereof to a database, a computing device, or a combination thereof; or (2) determining at least one map change to the configured map data based on the determined association, and transmitting the at least one map change to the vehicle, at least one other vehicle, the database, the computing device, or a combination thereof.

According to another embodiment, an apparatus comprises means for determining that a vehicle was involved in an accident. The apparatus also comprises means for receiving a report indicating map data configured in the vehicle at a time of the accident. The apparatus further comprises means for determining an association between the configured map data and the accident. The apparatus further comprises means for performing one or more of the following operations: (1) transmitting the association, at least a portion of the configured map data, or a combination thereof to a database, a computing device, or a combination thereof; or (2) determining at least one map change to the configured map data based on the determined association, and transmitting the at least one map change to the vehicle, at least one other vehicle, the database, the computing device, or a combination thereof.

According to one embodiment, a method comprises determining, by one or more processors, a status of one or more sensors, one or more systems, or a combination thereof of a vehicle. The method also comprises transmitting, by the one or more processors, a request for a map update based on the status of the one or more sensors, the one or more systems, or a combination thereof of the vehicle. The method further comprises receiving, by the one or more processors, the map update in response to the request. The method further comprises configuring, by the one or more processors, at least one system of the vehicle to operate using the map update.

According to another embodiment, an apparatus comprising at least one processor, and at least one memory including computer program code, the at least one memory and the computer program code configured to, with the at least one processor, cause the apparatus to determine a status of one or more sensors, one or more systems, or a combination thereof of a vehicle. The apparatus is also caused to transmit a request for a map update based on the status of the one or more sensors, the one or more systems, or a combination thereof of the vehicle. The apparatus is further caused to receive the map update in response to the request. The apparatus is further caused to configure at least one system of the vehicle to operate using the map update.

According to another embodiment, a computer-readable storage medium carrying one or more sequences of one or more instructions which, when executed by one or more processors, cause an apparatus to determine a status of one or more sensors, one or more systems, or a combination thereof of a vehicle. The apparatus is also caused to transmit a request for a map update based on the status of the one or more sensors, the one or more systems, or a combination thereof of the vehicle. The apparatus is further caused to receive the map update in response to the request. The apparatus is further caused to configure at least one system of the vehicle to operate using the map update.

According to another embodiment, an apparatus comprises means for determining a status of one or more sensors, one or more systems, or a combination thereof of a vehicle. The apparatus also comprises means for transmitting a request for a map update based on the status of the one or more sensors, the one or more systems, or a combination thereof of the vehicle. The apparatus further comprises means for receiving the map update in response to the request. The apparatus further comprises means for configuring at least one system of the vehicle to operate using the map update.

According to one embodiment, a method comprises receiving data indicating an operational status of a vehicle. The method also comprises processing the data to determine a degraded operational state of the vehicle. The method further comprises computing an estimated time of arrival, a route, or a combination thereof of the vehicle based on the degraded operational state.

According to another embodiment, an apparatus comprising at least one processor, and at least one memory including computer program code, the at least one memory and the computer program code configured to, with the at least one processor, cause the apparatus to receive data indicating an operational status of a vehicle. The apparatus is also caused to process the data to determine a degraded operational state of the vehicle. The apparatus is further caused to compute an estimated time of arrival, a route, or a combination thereof of the vehicle based on the degraded operational state.

According to another embodiment, a computer-readable storage medium carrying one or more sequences of one or more instructions which, when executed by one or more processors, cause an apparatus to receive data indicating an operational status of a vehicle. The apparatus is also caused to process the data to determine a degraded operational state of the vehicle. The apparatus is further caused to compute an estimated time of arrival, a route, or a combination thereof of the vehicle based on the degraded operational state.

According to another embodiment, an apparatus comprises means for receiving data indicating an operational status of a vehicle. The apparatus also comprises means for processing the data to determine a degraded operational state of the vehicle. The apparatus further comprises means for computing an estimated time of arrival, a route, or a combination thereof of the vehicle based on the degraded operational state.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2C is a flowchart of a process for evaluating an autonomous vehicle's damages in an accident and for recommending a path forward, according to one or more example embodiments;

DESCRIPTION OF SOME EMBODIMENTS

Figure 1:
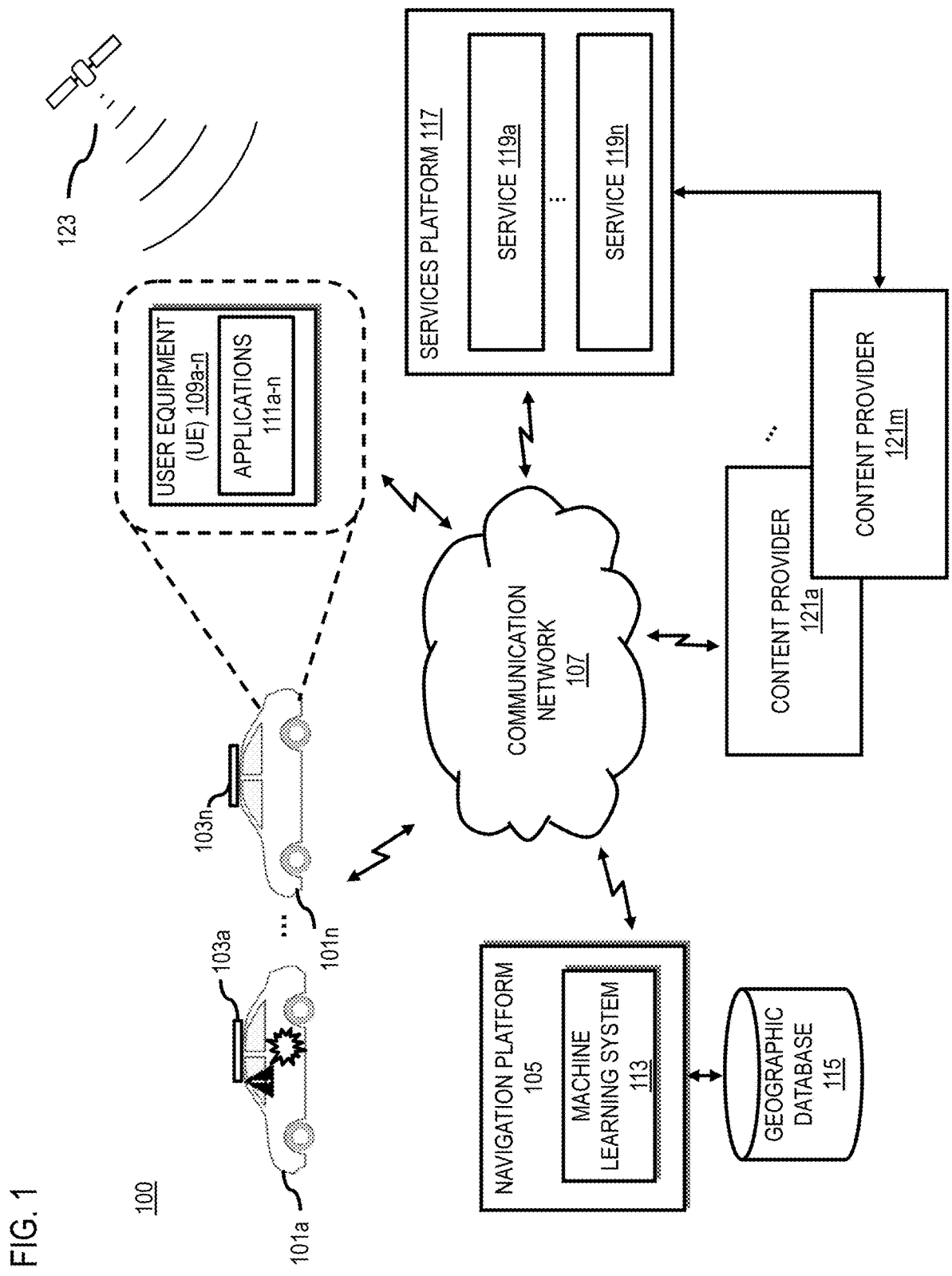
FIG. 1 is a diagram of a system capable of evaluating, reporting, and handling an autonomous vehicle involving an accident and/or malfunction, according to one or more example embodiments.

Examples of a method, apparatus, and computer program for evaluating, reporting, and handling an autonomous vehicle involving an accident and/or malfunction are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to HAD vehicles as well as to any types vehicles which sensor/system malfunction(s) and/or accident(s) can be determined as associated with map data configured in the vehicle at a time of the malfunction/accident.

As noted above, autonomous vehicles are able to drive themselves without the input of vehicle passengers or occupants, via sensors to measure conditions outside the vehicles, such as vision, LiDAR (Light Detection And Ranging), radar, ultrasonic range, Global Positioning System (GPS), etc. The advanced driver assist systems (ADAS) usually control vehicle trajectories using configurations (e.g., vehicle speeds, acceleration rates, braking rates, etc. under different scenarios) based on map data and/or sensor data obtained via using sensor systems and V2X communication. With the information, the vehicles generally can react to changing situations.

As mentioned, some ADAS may monitor sensors/systems during operation and/or an accident, report technical issues, record and log sensors data related to incidents, capture scenes around a user/vehicle, dial 911, ask the occupant(s) to manually operate the vehicle, order a replacement vehicle, etc. However, ADAS fails to determine the root cause of the accident that was attributable to map data at the time of the accident, and share this information to prevent future accidents. Recording the map data can be critical when an accident occurs as the map could be a key reason why an accident occurred in the first place. No matter how sophisticated sensors are deployed by autonomous vehicles for self-driving, obsolete or incorrect maps could lead bad decisions and accidents. For example, an incorrect speed limit on a road link could cause the vehicle drive too fast to break timely to avoid an accident. Understanding and reporting the role the map data configured in the vehicle at a time of the accident can trigger map updates for self-driving systems to avoid similar accidents.

In addition, after detecting a sensor/system malfunction or an accident, ADAS may determine based on sensor data whether a vehicle require repair services and whether the vehicle is able to keep driving safely based severity and/or urgency of the services. However, the existing solutions to assist the vehicle to continue driving safely do not include supplementing malfunctioning sensors with map updates based on the sensor status to ensure that the vehicle is able to drive even with malfunctioning sensors/systems.

Moreover, after accessing sensors status, ADAS decides that the vehicle is allowed to keep driving, without evaluating impact on estimated time of arrival based on the duration of malfunctioning sensors/systems or accident, a degraded state of the vehicle (e.g., a reduce speed due to malfunctions/accidents), etc.

Figure 2A:
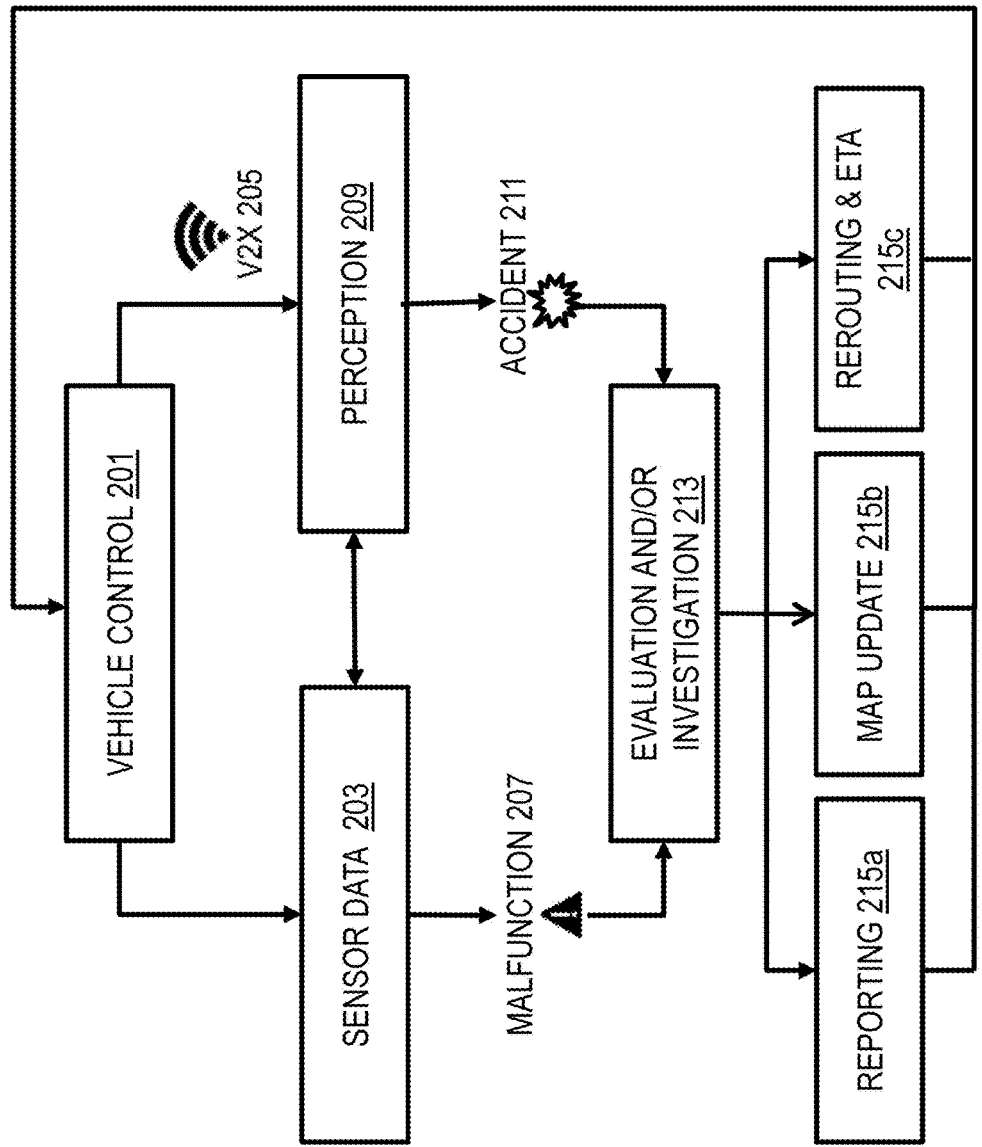
FIG. 2A is a diagram of an example process for evaluating, reporting, and handling an autonomous vehicle involving an accident and/or malfunction, according to one or more example embodiments.

To address these problems, a system 100 of FIG. 1 introduces the capability of evaluating, reporting, and handling an autonomous vehicle involving an accident and/or malfunction. FIG. 1 is a diagram of a system capable of evaluating, reporting, and handling an autonomous vehicle involving an accident and/or malfunction, according to one or more example embodiments. The system 100 can improve map data and deliver dynamic traffic content to vehicles, such as to autonomous vehicles in an open location platform pipeline (OLP) for self-driving. FIG. 2A is a diagram of an example process for evaluating, reporting, and handling an autonomous vehicle involving an accident and/or malfunction, according to one or more example embodiments. In one embodiment, the system 100 can perform vehicle control 201 using sensor data 203 and V2X communication information 205. A V2X (vehicle-to-everything) communication system can incorporate specific types of communication such as V2I (vehicle-to-infrastructure), V2N (vehicle-to-network), V2V (vehicle-to-vehicle), V2P (vehicle-to-pedestrian), V2D (vehicle-to-device), V2G (vehicle-to-grid), etc.

In one embodiment, the vehicle control 201 can include an advanced driver-assistance system (ADAS) that support automated lane-centering (ALC), adaptive cruise control (ACC), etc. thereby controlling the vehicle to move on a path chosen by an automatic guided vehicle system (AGVS), via increasing/decreasing the speed of car, and maintaining a proper distance to avoid collision.

In one embodiment, the system 100 can process the sensor data 203 to determine sensor/system malfunction(s) 207 (e.g., radar), while the V2X communication information 205 is optional. In another embodiment, the system 100 can process the sensor data 203 and/or the V2X communication information 205 to validate the sensor/system malfunction(s) 207.

In one embodiment, the system 100 can process the sensor data 203 and/or the V2X communication information 205 for perception 209 (e.g., of objects, the environment, weather, etc.), and determine an accident 211. By way of example, the vehicle(s) which detected an accident can automatically request V2V information from all vehicle(s) involved in the accident to document the accident scene and/or send the related data to a central server or a cloud. The V2V information can include (1) IDs and other identification of the vehicle(s), (2) location(s) and timestamp(s) recorded by the vehicle(s), (3) the number of occupants in each vehicle based on car seat sensors, safety belt sensors, etc., (4) sensor status (e.g., seat belts, air bags, heat sensor, battery/gasoline, vehicles weights, etc.), (5) a predetermined time period (e.g., 2 minutes) of audio and/or video feeds, (6) map data and/or map versions being used at the time of the accident, etc. In one embodiment, the V2V information can be saved for a predetermined time period (e.g., 15 minutes of traces/logs), and stored in a safe manner (e.g., in a Blackbox and/or using Blockchain).

The system 100 can then conduct evaluation and/or investigation 213 to (1) determine an association between the accident 211 and map data configured in the vehicle at a time of the accident for reporting 215a; (2) request for a map update 215b based on the sensor/system malfunction(s) 207 and/or the accident 211; and (3) determine a degraded operational state of the vehicle base on the sensor/system malfunction(s) 207 and/or the accident 211, for re-routing and estimating a time of arrival 215c.

Regarding the association between the accident 211 and map data, there were many instances that car accidents were caused by map errors. As such, recording the map data can be critical when the map was a key reason why an accident occurred. Although autonomous vehicles rely on sensor data to control driving, obsolete or incorrect map data could cause the vehicle to make decisions leading to an accident. In one embodiment, the association between the configured map data and the accident can be determined based on a statistical analysis of the accident's characteristics and various sensor status data and/or historical accident data using artificial intelligence algorithms.

For instance, an incorrect speed limit or a reported traffic flow speed on a road link could cause the vehicle drive too fast to break on time. As another instance, a driver/vehicle followed map data and made an illegal turn that led to a multi-car accident. As yet another instance, a truck followed map data and got wedged under a bridge. Other type of map errors can include incorrect road names, wrong information about one-way and two-way roads, incorrectly drawn roads, wrong road closures, non-existing and/or missing roads, wrong addresses and/or marker locations, etc. In these cases, the system 100 can discover and report the map errors, the accidents, and/or the association between the map errors and the accidents to a user device and/or a database, to prevent future accidents. For example, a reported map error can be used to update the map data shared by many vehicles. As another example, a reported accident can be used to request/ support first responders to accidents, and to reduce traffic congestion caused by the accident. As another example, a reported association between the accident and the map data can be used to improve the design of the map data, the road network, the vehicle, the self-driving infrastructure, etc.

In one embodiment, the system 100 can define specific rules and protocols for sharing information when autonomous vehicles are involved in an accident, and then initiate the autonomous vehicles to efficiently report accident related information. By way of example, the protocol can request vehicles involved or near an accident to share sensors data and/or accident relevant information. Detailed protocols and processes for sharing information could be defined depending on the severity of the damages/accident, the type of accident, who is involved in such accident, etc. For instance, the protocols can include sharing the current status quo of the vehicles that could carry on driving, such as minor malfunction(s), with or without passenger(s) in the vehicles, etc. The information shared via the rules and protocols can be used by the system 100 to determine the root cause of the accident, and to share the accident information with safety and security authorities to prevent future accidents, such as providing safety improvements related to cars and/or roads.

In one embodiment, the system 100 can rank autonomous vehicles based on safety related attributes (e.g., the reported accident information and their related analysis), while maintaining the privacy of the vehicle owners and/or occupants. In one embodiment, the ranking can be based on resilience of vehicles, e.g., continuing driving after reported incidents. The autonomous vehicle ranking information can be used by passengers to set safety criteria to choose which autonomous vehicles to hire (e.g., as a private or shared vehicle). For example, one user may find repeated minor accidents leading to significant delay by some vehicles (e.g., the least resilient ones) annoying, and want to avoid such vehicles. Another user only wants to use vehicles that can keep driving without any problem due to their robustness and resilience. Different users can set different ranking criteria for the system 100 to decide which autonomous vehicles to hire for the users.

In another embodiment, the system 100 can deploy an algorithm to compute the accident scene based on the captured data (e.g., the sensor data 203, the V2X communication information 205, etc.). In addition, the system 100 can replay accident scenes leveraging the captured data, such as for the first responders, medical care providers, insurance companies, etc. to better handle the accident. Also, the system 100 can generate optimal routes and mode of transport (e.g., a vehicle, a helicopter or drone, etc.) for first responders to get to the accident scene. The system 100 can also generate optimal routes for other vehicles to drive around the chaotic accident scene. Further, the system 100 can leverage the replay capabilities for first responders and/or artificial intelligence algorithms to determine the cause of the accident and/or to recommend which equipment and experts to send to the accident location. The system 100 can reside in the vehicle 101, a group of vehicles via a vehicle-to-vehicle (V2V) ad hoc communication network, a self-driving infrastructure, a cloud, etc.

Figure 2B:
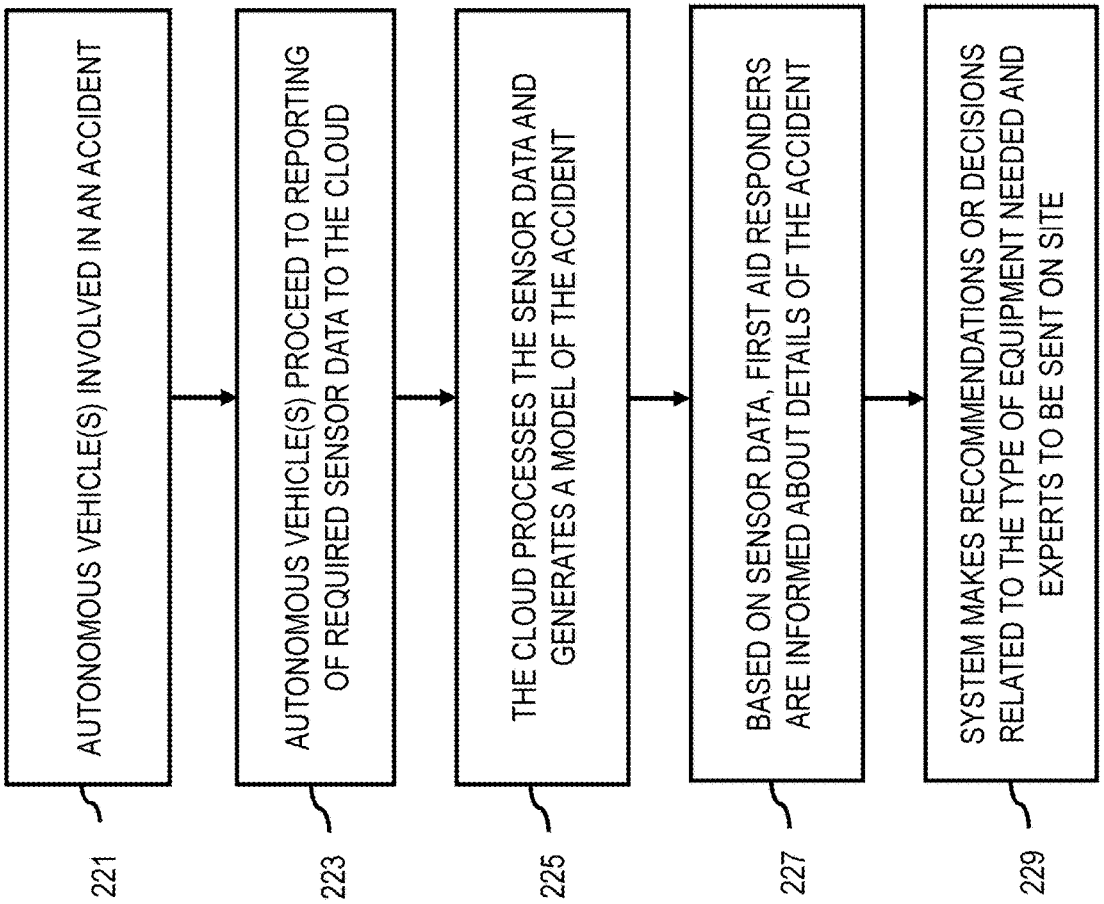
FIG. 2B is a flowchart of a process for supporting first responders to accidents involving autonomous vehicles, according to one or more example embodiments.

FIG. 2B is a flowchart of a process for supporting first responders to accidents involving autonomous vehicles, according to one or more example embodiments. Driver and/or vehicle awareness of the road network can be improved for all levels 0-5 of driving automation via vehicle-to-everything (V2X) communication and big data environment. The Society of Automotive Engineers International defines driving automation are six levels: Level 0

(automated system has no sustained vehicle control), Level 1 ("hands on"), Level 2 ("hands off"), Level 3 ("eyes off"), Level 4 ("mind off"), and Level 5 ("steering wheel optional"). In many embodiments, autonomous vehicles achieve self-driving by using sensor systems and V2X communication in combination with, for instance, map data (e.g., high-definition map data).

In this embodiment, in step 221, some autonomous vehicles are involved in an accident. In step 223, the vehicles can proceed to report their sensors data information required by the sharing protocol to a central server and/or a cloud. In step 225, the cloud can process the sensor data and generates a model of the accident. Based on the sensor data, the system 100, the central server, and/or cloud can inform first responders various details related to the accident in step 227, including access to a "replay" function of that accident which has been generated by the system 100 using the data of various vehicles and/or infrastructure equipment located near the accident scene. Then the system 100, the central server, and/or cloud can make recommendations or decisions related to the type of equipment needed and experts to be sent to the accident site in step 229.

As mentioned, the system 100 can evaluate the vehicle damages and its ability to continue driving after the malfunction(s) 207 and/or the accident 211, and recommend a path forward. In one embodiment, the system 100 can determine if the vehicle at issue is able and safe to keep driving with the malfunction(s) and/or after the accident based on sensor data from the vehicle, neighboring vehicles, the self-driving infrastructure (e.g., traffic cameras), etc. If the vehicle is not safe or not allowed to drive further, a replacement vehicle can be automatically dispatched. By way of example, the system 100 can evaluate status of all critical sensors of the vehicle to determine whether the vehicle is able to drive safely, and trigger a request for map update based on the status of the sensors to ensure that the vehicle is able to drive even with some malfunctioning and/or damaged sensors/systems. In another embodiment, the system 100 can compute a score that reflects the probability of the vehicle at issue to drive safely.

Regarding the request for a map update 215b, the system 100 can, for example, trigger a request for a speed sign map layer to send to the vehicle, based on the determination that the 3D camera of the vehicle is malfunctioning and/or broken. As another example, when determining that the radar system of the vehicle is malfunctioning and/or broken, the system 100 can request the latest map layer of physical dividers/barriers for the vehicle to drive without a functioning radar system.

Regarding re-routing and estimating a time of arrival 215c, the system 100 can determine a degraded state of the vehicle as authorized to, e.g. stop, continue without passengers, continue with passengers until a safe stop, continue until a destination, etc. New estimated times of arrival (ETAs) can then be computed based on the degraded state of the vehicle. Further, the system 100 can contextually determine an action to trigger based on the degraded state of the vehicle, the area where this malfunction/accident happens, the context of the journey (e.g. close to destination), etc. For example, when a vehicle has injured passengers on board, the system 100 can request an ambulance for the accident. As another example, when no fire is detected and there is no passenger on board, no need for the system 100 to request a fire truck.

FIG. 2C is a flowchart of a process for evaluating an autonomous vehicle's damages in an accident and for recommending a path forward, according to one or more example embodiments. In this embodiment, in step 241, an autonomous vehicle is involved in an accident. In step 243, the autonomous vehicle can assess the status of its sensors. The autonomous vehicle then can decide that it is not safe to drive further in step 245. A replacement autonomous vehicle is automatically dispatched to pick up the passenger(s) of the autonomous vehicle to reach their final destination(s), upon the request of the autonomous vehicle and/or the system 100 in step 247.

As shown in FIG. 1, the system 100 can collect a plurality of instances of vehicle sensor data, and/or traffic incident information from one or more vehicles 101a-101n (also collectively referred to as vehicles 101) (e.g., autonomous vehicles, HAD vehicles, semi-autonomous vehicles, etc.) having one or more vehicle sensors 103a-103n (also collectively referred to as vehicle sensors 103) and having connectivity to a navigation platform 105 via a communication network 107. For example, the sensors may include infrared sensors, LiDAR, radar, sonar, cameras (e.g., visible, night vision, etc.), global positioning system (GPS), and/or other devices/sensors that can scan and record data from the autonomous vehicle 101's surroundings for determining user vision capability information and/or a maximum operational configuration for the vehicle 101.

In one embodiment, the sensor data 203 may be collected from vehicle sensors 103 such as light sensor(s), orientation sensor(s) augmented with height sensor(s) and acceleration sensor(s), tilt sensor(s) to detect the degree of incline or decline of the vehicle along a path of travel, moisture sensor(s), pressure sensor(s), audio sensor(s) (e.g., microphone), 3D camera(s), radar system(s), LiDAR system(s), infrared camera(s), rear camera(s), ultrasound sensor(s), GPS receiver(s), windshield wiper sensor(s), ignition sensor(s), brake pressure sensor(s), head/fog/hazard light sensor(s), ABS sensor(s), ultrasonic parking sensor(s), electronic stability control sensor(s), vehicle speed sensor(s), mass airflow sensor(s), engine speed sensor(s), oxygen sensor(s), spark knock sensor(s), coolant sensor(s), manifold absolute pressure (MAF) sensor(s), fuel temperature sensor(s), voltage sensor(s), camshaft position sensor(s), throttle position sensor(s), O2 monitor(s), etc. operating at various locations in the vehicle.

In another embodiment, the sources of the sensor data 203 may also include sensors configured to monitor passengers, such as O2 monitor(s), health sensor(s) (e.g. heart-rate monitor(s), blood pressure monitor(s), etc.), etc.

By way of example, the sensors 103 may detect its own malfunctioning station, passenger status (e.g., the number of passengers actively seated), an accident, weather data, etc. Further, sensors about the perimeter of the vehicle may detect the relative distance of the vehicle from sidewalks, lane or roadways, the presence of other vehicles, trees, benches, water, potholes and any other objects, or a combination thereof. Still further, the sensors 103 may provide in-vehicle navigation services, and location based services may be provided to user device(s) associated with user(s) of the vehicle 101.

As another example, the 3D camera can be used to detect and identify objects (e.g., vehicles, pedestrians, bicycles, traffic signs and signals, road markings, etc.), to determine distances from the vehicle, etc. For instance, the radar data (e.g., short-range, and long-range radar) can be used to compute object distances and speeds in relation to the vehicle in real time, even during fog or rain. By way of example, the short-range (24 GHz) radar supports blind spot monitoring, lane-keeping, parking, etc., while the long-range (77 GHz) radar supports distance control and braking.

For instance, the LiDAR data can be used the same way as the radar data to determine object distances and speeds, and additionally to create 3D images of the detected objects and the surroundings as well as a 360-degree map around the vehicle. The redundancy and overlapping sensor capabilities ensure autonomous vehicles to operate in a wide range of environmental and lighting conditions (e.g., rain, a jaywalking pedestrian at night, etc.).

A 3D camera may have hardware problems (e.g., lithium-ion or small RTC battery power low/lost, blown wire/fuse, plastic lens base and housing have expanded in the heat, temperature is too low for camera to start and operate normally, etc.), and/or software problems (e.g., crashes, hangs, displays a blank white or black screen, etc.). Malfunctions of a LiDAR system can happen when rain, dust, snow, dirt, or other particles obscure the LiDAR window, and block/deflect laser beams and decrease sensor visibility. Malfunctions of a radar system can include: (1) a shorter than maximum range to sense an object of a predetermined size, (2) a lower measurement accuracy of an object location in range and angle, (3) inability to distinguish one object from another, (4) inability to detect the target object echo when masked by large clutter echoes, unintentional interfering signals from other transmitters, (5) inability to recognize a type of object, etc.

In one embodiment, the V2X communication information 205 can include any information between a vehicle and any entity that may affect the vehicle operation, such as forward collision warning, lane change warning/blind spot warning, emergency electric brake light warning, intersection movement assist, emergency vehicle approaching, roadworks warning, platooning, etc.

In one instance, the system 100 can also collect the real-time sensor data, and/or traffic incident information from one or more user equipment (UE) 109a-109n (also collectively referenced to herein as UEs 109) associated with the vehicle 101 (e.g., an embedded navigation system), a user or a passenger of a vehicle 101 (e.g., a mobile device, a smartphone, etc.), or a combination thereof. In one instance, the UEs 109 may include one or more applications 111a-111n (also collectively referred to herein as applications 111) (e.g., a navigation or mapping application). In one embodiment, the navigation platform 105 includes a machine learning system 113 for analyzing the sensor data. The sensor data collected may be stored a geographic database 115.

In one embodiment, the system 100 may also collect real-time sensor data, and/or traffic incident information from one or more other sources such as government/municipality agencies, local or community agencies (e.g., a police department), and/or third-party official/semi-official sources (e.g., a services platform 117, one or more services 119a-119n (collectively referred to as services 119), one or more content providers 121a-121m (collectively referred to as content providers 121), etc.

In another embodiment, the sensor information can be supplemented with additional information from network-based services such as those provided by the services platform 117 and the services 119. By way of example, the services 119 can include mapping service, navigation services, and/or other data services that provide data for evaluating, reporting, and handling an autonomous vehicle involving an accident and/or malfunction. In one embodiment, the services platform 117 and/or the services 119 can provide contextual information such as weather, traffic, etc. as well as facilitate communications (e.g., via social networking services, messaging services, crowdsourcing services, etc.) among vehicles to share configuration information. In one embodiment, the services platform 117 and/or the services 119 interact with content providers 121 who provide content data (e.g., map data, imaging data, etc.) to the services platform 117 and/or the services 119. In one embodiment, the UE 109 executes an application 119 that acts as client to the navigation platform 105, the services platform 117, the services 119, and/or the content providers 121. In one embodiment, the sensor data, contextual information, and/or configuration information can be stored in a database (e.g., the geographic database 115) for use by the navigation platform 105. All information shared by the system 100 should be filtered via privacy policy and rules set by the system 100 and/or data owners, such as removing personal information before sharing with third parties.

Figure 3:
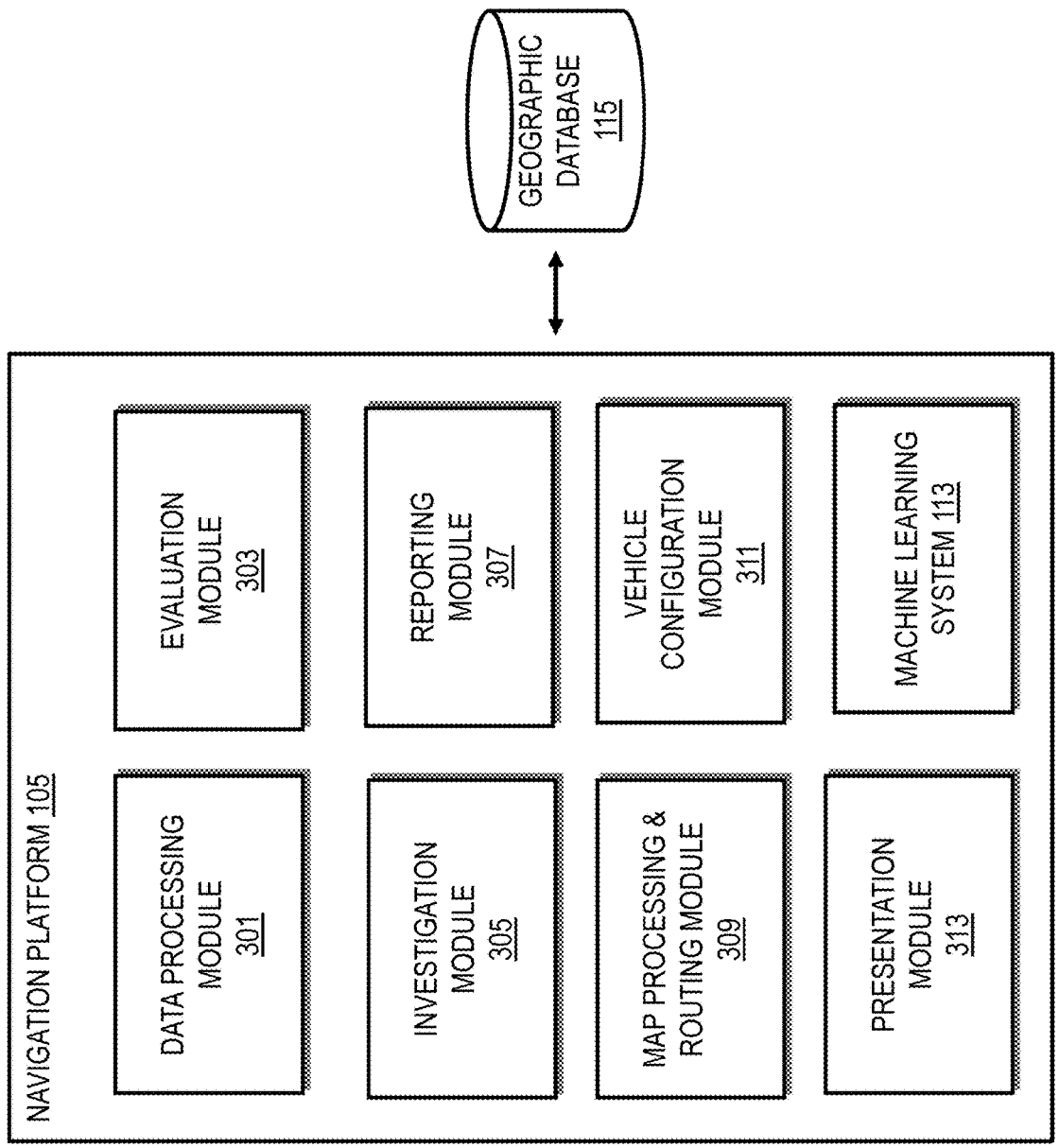
FIG. 3 is a diagram of the components of a navigation platform, according to one or more example embodiments.

FIG. 3 is a diagram of the components of the navigation platform 105, according to one embodiment. By way of example, the navigation platform 105 includes one or more components for providing hybrid traffic incident identification, according to the various embodiments described herein. It is contemplated that the functions of these components may be combined or performed by other components of equivalent functionality. In one embodiment, the navigation platform 105 includes a data processing module 301, an evaluation module 303, an investigation module 305, a reporting module 307, a map processing and routing module 309, a vehicle configuration module 311, a presentation module 313, and the machine learning system 113 has connectivity to the geographic database 115. The above presented modules and components of the navigation platform 105 can be implemented in hardware, firmware, software, or a combination thereof. Though depicted as a separate entity in FIG. 1, it is contemplated that the navigation platform 105 may be implemented as a module of any other component of the system 100. In another embodiment, the navigation platform 105, the machine learning system 113, and/or the modules 301-313 may be implemented as a cloud-based service, local service, native application, or combination thereof. The functions of the navigation platform 105, the machine learning system 113, and/or the modules 301-313 are discussed with respect to FIGS. 4-8D.

Figure 4:
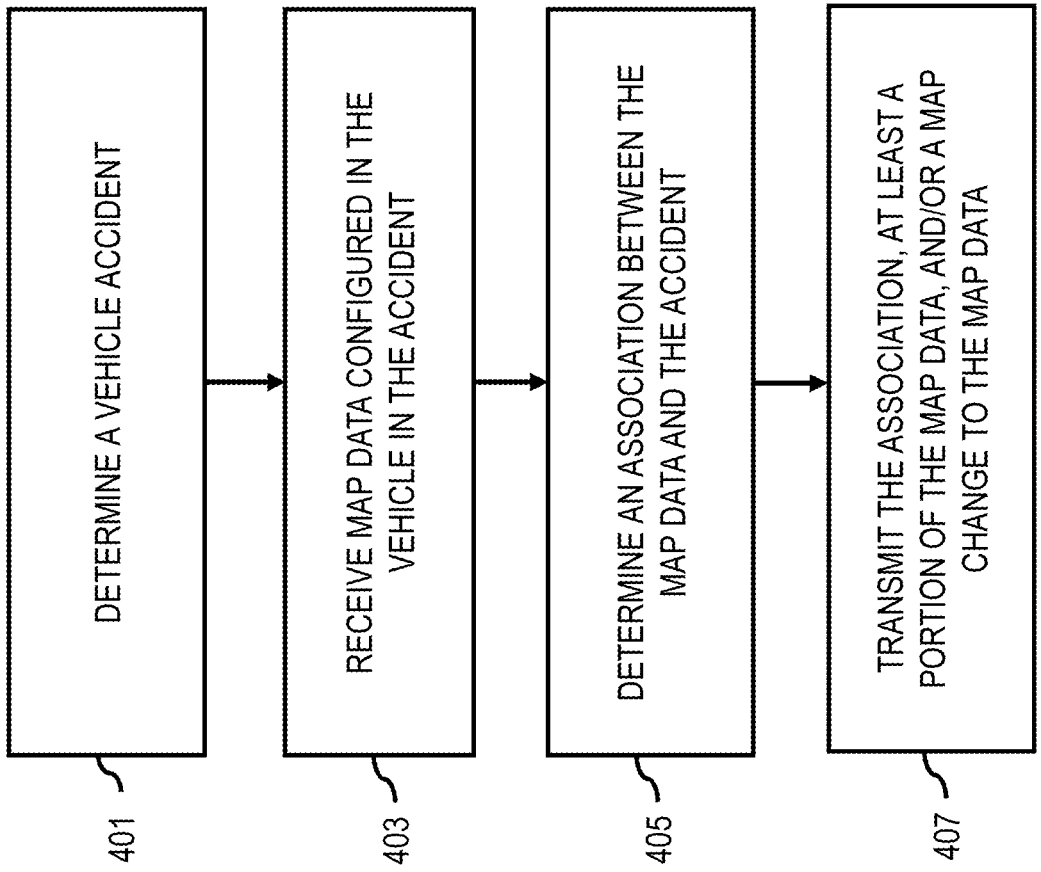
FIG. 4 is a flowchart of a process for reporting accident(s) and/or an association between configured map data and the accident(s), according to one or more example embodiments.
Figure 11:
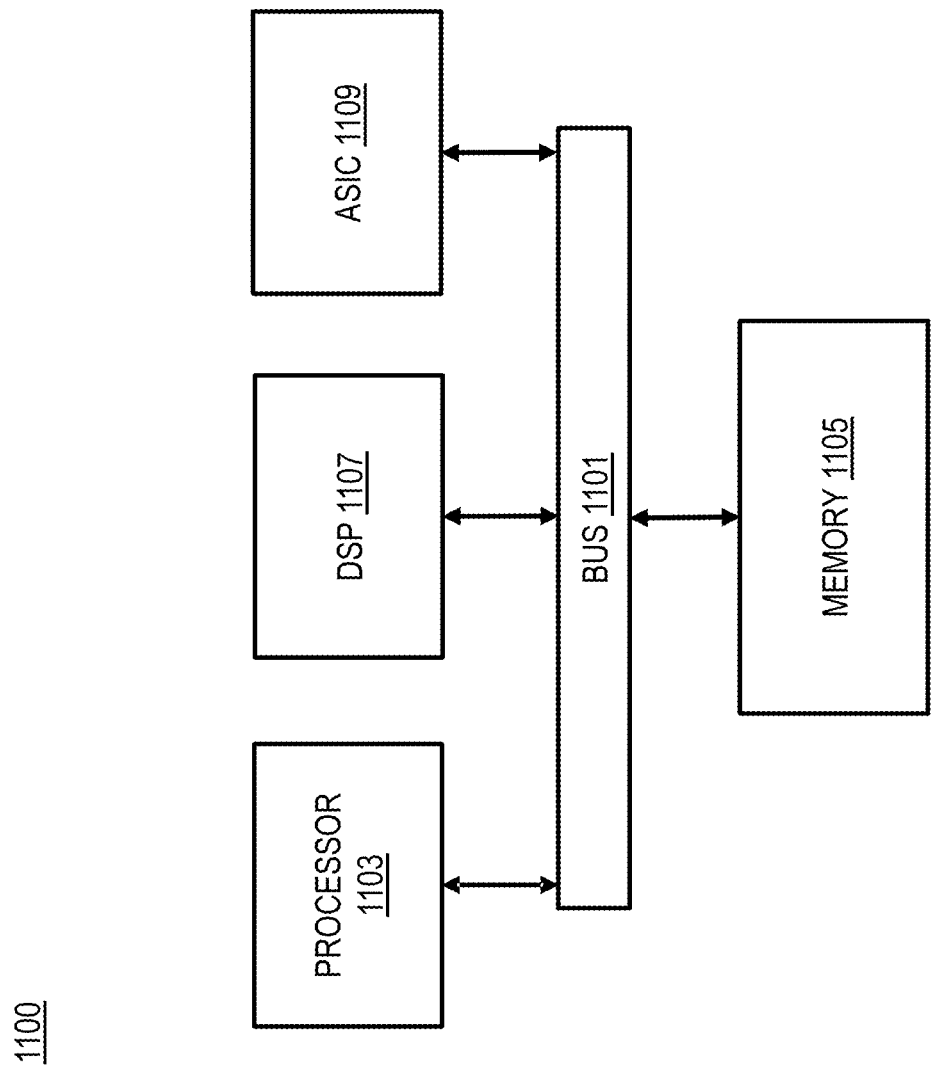
FIG. 11 is a diagram of a chip set that can be used to implement an embodiment of the invention, according to one or more example embodiments.

FIG. 4 is a flowchart of a process for reporting accident(s) and/or an association between configured map data and the accident(s), according to one or more example embodiments. In various embodiments, the navigation platform 105, the machine learning system 113, and/or any of the modules 301-313 may perform one or more portions of the process 400 and may be implemented in, for instance, a chip set including a processor and a memory as shown in FIG. 11. As such, the navigation platform 105 and/or the modules 301-313 can provide means for accomplishing various parts of the process 400, as well as means for accomplishing embodiments of other processes described herein in conjunction with other components of the system 100. The steps of the process 400 can be performed by any feasible entity, such as the navigation platform 105, the modules 301-313, etc. Although the process 400 is illustrated and described as a sequence of steps, it is contemplated that various embodiments of the process 400 may be performed in any order or combination and need not include all the illustrated steps.

In one embodiment, in step 401, the data processing module 301 can determine that a vehicle was involved in an accident. For instance, the data processing module 301 can process the sensor data 203 and/or and the V2X communication information 205 to determine that a vehicle 101 was involved in an accident. By way of example, accelerometers and/or crash sensors can detect a sudden stop of the vehicle 101 itself and/or neighboring vehicles due to an accident, by measuring a vehicle slowing down speed in a frontal crash, accelerating to the side in a side-impact crash, an onset of a rollover crash, etc. As another example, fire/smoke sensors can detect fire/smoke of a vehicle accident.

In one embodiment, in step 403, the evaluation module 303 can receive a report indicating map data configured in the vehicle at a time of the accident. By way of example, the report can be generated by the data processing module 301 based on the sensor data 203, the V2X communication information 205, etc.

In another embodiment, the report can further include one or more characteristics of the accident. There are many different accident scenarios with specific characteristics that require different actions taken by the vehicle 101 and/or other actors such as first responders, etc. By way of examples, the accident scenarios may be that the vehicle hit by a train, hit by lightning, hit by a moose, hit by a wrecking ball, hit by a deer, hit by an invisible force, bit by a 18-wheeler, hit by a truck, hit by a turtle, hit by a tree, etc. Other accident scenarios may be that the vehicle 101 hit a human, a bicycle, a motorbike, a truck, a tree, etc. For instance, when the vehicle 101 is hit by another vehicle or an object (e.g., a tree), the evaluation module 303 can initiate the vehicle configuration module 311 to configure the vehicle 101 (e.g., via modifying acceleration, braking, speed parameters, etc.) to stay where it is, or to move the vehicle 101 out of the road, etc. As another instance, when the vehicle 101 hit a human, the evaluation module 303 can initiate the vehicle configuration module 311 to configure the vehicle 101 to bring the human to a nearby hospital or to keep the human inside the vehicle until an ambulance arrives. Alternatively, the evaluation module 303 can initiate the vehicle configuration module 311 to configure the vehicle 101 to position itself to protect the human from other vehicles when the human lies on the road not moving and/or unprotected.

In one embodiment, in step 405, the investigation module 305 can determine an association between the configured map data and the accident (e.g., map data errors as a cause of an accident). In one embodiment, the association between the configured map data and the accident is based on a statistical analysis (e.g., using machine learning) of the accident, historical accident data, or a combination thereof. Applicable machine learning algorithms may include a neural network, support vector machine (SVM), decision tree, k-nearest neighbors matching, etc. For example, the statistical analysis can determine the configured map data as the primary cause of the accident. As another example, the statistical analysis can determine the configured map data as a secondary cause of the accident, along with one or more other causes of the accident, such as distracted driving, speeding/reckless driving, rain, wet roads, etc.

In another embodiment, the investigation module 305 can receive sensor data from the vehicle (e.g., the sensor data 203), the at least one other vehicle, at least one self-driving infrastructure sensor (e.g., the V2X communication information 205), or a combination thereof. The investigation module 305 can then process the received data to determine at least one sensed attribute of a road link (e.g., a one-way road), a map feature (e.g., a new bridge), or a combination thereof associated with a location of the accident. By way of examples, the accident involves a crash caused by driving in the reverse direction of the one-way road, a 18 wheeler wedged under the bridge, etc. The investigation module 305 can then compare the at least one sensed attribute against at least one mapped attribute (e.g., a two-way road) of the road link, the map feature (e.g., no such bridge), or a combination thereof to determine the at least one map change (e.g., map updates to correct into the one-way road and to add the bridge). For instance, the investigation module 305 can determine that the at least one sensed attribute (e.g., a tree, a bridge, etc.) is missing from the configured map data based on the comparing. The at least one map change includes adding the at least one sensed attribute (e.g., a tree, a bridge, etc.).

As another example, the investigation module 305 can determine a version number of the configured map data and a current version number of the database. For instance, the investigation module 305 can determine that the map versions being used at the time of the crash is an obsolete map which caused the accident (e.g., an outdated version of map data or the database). As such, the at least one map change can include an update to the configured map data to the current version number. As another example, the investigation module 305 can assess map version(s) of vehicle(s) involved in an accident, such as the most up-to-date map(s), the most obsolete map(s), etc., and report the map version data to map service provider(s), vehicle manufacturer(s), owner(s), occupant(s), insurance companies, police, etc. for further processing. For instance, the map service provider(s) can contact the owner(s)/occupant(s) for map update(s). As another instance, the insurance companies and/or the police can post sanctions/liability in case of an accident caused by outdated map data when the owner(s)/occupant(s) failed to keep the maps updated.

Autonomous vehicles could be in one of the many possible modes: driving autonomously, manually driven by human, parked, disengaged in a disengagement mode, etc. A disengagement mode involves a situation in which the autonomous system stops working, or the driver wants to take control of the vehicle to correct a potentially unsafe action, or inaction, by the autonomous vehicle. In one embodiment, the investigation module 305 can receive data indicating at least one disengagement of an autonomous driving mode of the vehicle (i.e., not in any autonomous driving modes), the at least one other vehicle, or a combination thereof. The association between the configured map data and the accident is further based on the at least one disengagement of the autonomous driving mode. Knowing whether the vehicle 101 was in a disengagement mode could help finding the cause(s) of the accident and determining whether the cause(s) and/or mistake(s) associated with the cause(s) is linked to a human and/or a computer. Knowing which of the involved vehicle(s) was in a manual mode can be critical to have a full picture of the accident and to get a better analysis of the reaction time of involving vehicle(s)/driver(s), to determine cause(s) of the accident, such as an association between the configured map data and the accident.

For instance, the data can further indicate that the at least one disengagement of the autonomous driving mode was requested by an autonomous system of the vehicle, the least one other vehicle, or a combination thereof but the at least one disengagement was unsuccessful (e.g., the driver failed to take manual control although the vehicle requested). In this case, the investigation module 305 can determine that the driver failed to take manual control fully or partially and caused the accident.

In one embodiment, in step 407, the reporting module 307 can perform one or more of the following operations: (1) transmitting the association, at least a portion of the configured map data, or a combination thereof to a database (e.g., the geographic database 115), a computing device (e.g., UEs 109), or a combination thereof; or (2) determining at least one map change to the configured map data based on the determined association, and transmitting the at least one map change to the vehicle, at least one other vehicle, the database, the computing device, or a combination thereof. In other embodiments, the database can be associated with one or more government/municipality agencies, one or more local or community agencies (e.g., a police department), one or more official/semi-official third-parties (e.g., the services 119 including mapping service, navigation services, etc.), etc.

For instance, the at least one map change can be determined based on the at least one map change that can reduce a probability of an occurrence of a subsequent accident (e.g., adding a tree/bridge in a map). As another instance, the at least one map change includes a change to one or more map layers (e.g., a new speed limit sign), one or more stored map features (e.g., a vehicle repair shop), or a combination thereof of the database.

In another embodiment, the association between the configured map data and the accident, the at least one map change, or a combination thereof is further based on the one or more characteristics of the accident. By way of example, the vehicle 101 hit a tree that was not marked in the map data configured at the time of the accident.

In one embodiment, an accident cause machine learning model can be built by the machine learning system 113 based on the sensor data, malfunction data, accident data, etc. as training data. By way of example, the machine learning system 113 can determine elements of an accident using parameters/factors such as characteristics of the vehicle (e.g., model, age, maintenance records, etc.), characteristics of drivers/passengers (e.g., appointment/deliver schedules, comfort level preferences, etc.), driving context and conditions (e.g., road geometry/conditions, traffic, weather, etc.), map data, etc. that describe a distribution or a set of distributions of the accident, thereby calculating cause(s) of the accident (with a respective accident type, a respective accident severity, etc.) as reported from various sources, such as government/municipality agencies, local or community agencies (e.g., a police department), and/or third-party official/semi-official sources.

In one embodiment, the machine learning system 113 can select respective weights of the parameters/factors, and/or various traffic incident information sources, for example, based on their respective reliability. In another embodiment, the machine learning system 113 can further select or assign respective correlations, relationships, etc. among the traffic incident information sources, for determining a confidence level of an accident cause. In one instance, the machine learning system 113 can continuously provide and/or update the accident cause machine learning model using, for instance, a support vector machine (SVM), neural network, decision tree, etc.

The above-discussed embodiments investigate the role of the map data configured in the vehicle at a time of the accident to understand the cause leading to accidents, and to improve the learning loops for continuous improvements of self-driving systems to prevent future accidents.

The above-discussed embodiments allow autonomous vehicles to efficiently report accident related information (including an association between an accident and map data configured at the time of the accident) by defining specific rules and protocols for sharing information when one or more autonomous vehicles are involved in the accident, and sharing the accident information with safety and security authorities to prevent future accidents.

The above-discussed embodiments enable autonomous vehicles to handle situations related to road accidents with technologies embedded in autonomous vehicles as well as to help first responders to be more efficient in saving lives.

The above-discussed embodiments can rank autonomous vehicles based on safety related attributes (e.g., the reported accident information and their related analysis), that can be used to set safety criteria for users to decide which autonomous vehicles to hire.

Figure 5:
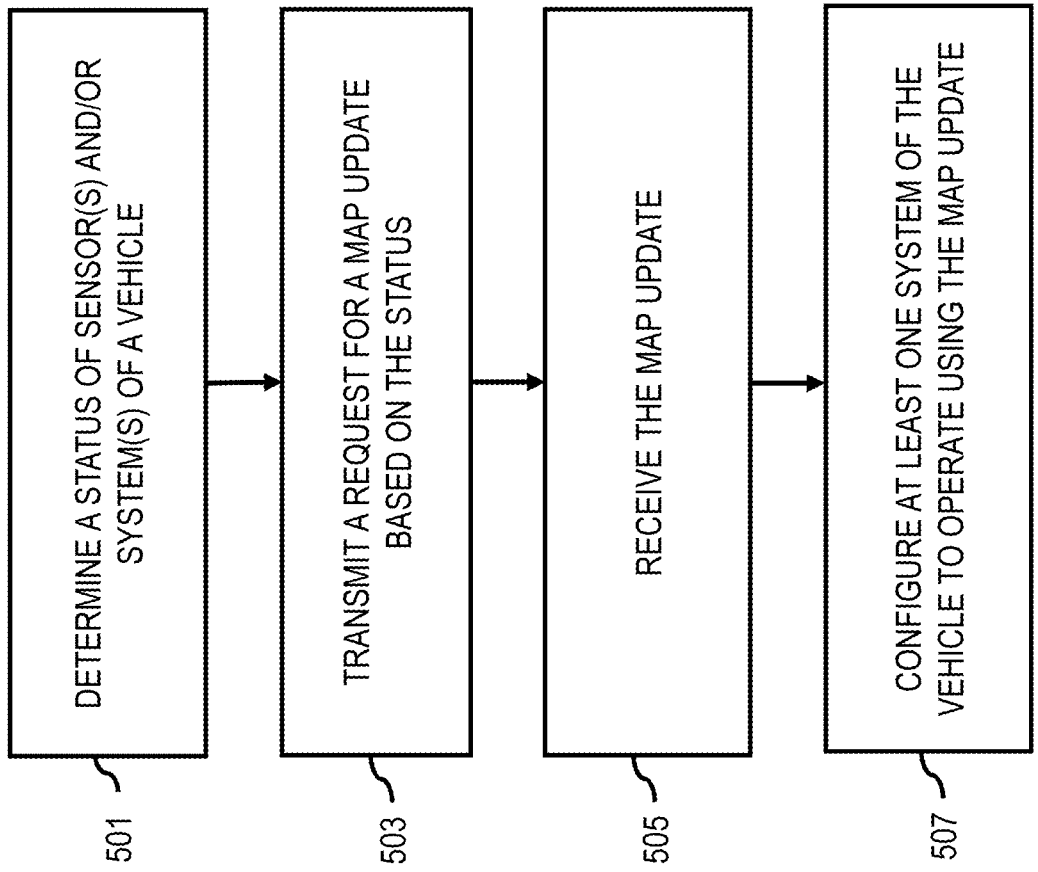
FIG. 5 is a flowchart of a process for configuring at least one system of a vehicle to operate using map update after sensor/system malfunction(s) and/or accident(s), according to one or more example embodiments.

FIG. 5 is a flowchart of a process for configuring at least one system of a vehicle to operate using map update after sensor/system malfunction(s) and/or accident(s), according to one or more example embodiments. In various embodiments, the navigation platform 105, the machine learning system 113, and/or any of the modules 301-313 may perform one or more portions of the process 500 and may be implemented in, for instance, a chip set including a processor and a memory as shown in FIG. 11. As such, the navigation platform 105 and/or the modules 301-313 can provide means for accomplishing various parts of the process 500, as well as means for accomplishing embodiments of other processes described herein in conjunction with other components of the system 100. The steps of the process 500 can be performed by any feasible entity, such as the navigation platform 105, the modules 301-313, etc. Although the process 500 is illustrated and described as a sequence of steps, its contemplated that various embodiments of the process 500 may be performed in any order or combination and need not include all the illustrated steps.

In one embodiment, in step 501, the evaluation module 303 can determine a status (e.g., normal, malfunctioning, damaged, etc.) of one or more sensors, one or more systems, or a combination thereof of a vehicle. Modern vehicles have 60-150 sensors to detect chemical and mechanical changes of its systems/components, and transmit the sensor/system status data to computers, but the sensors/systems can fail and/or malfunction as to relay no or wrong information.

In order to properly evaluate whether it is safe for the vehicle to drive with malfunction(s) or after an accident, the evaluation module 303 can proceed to an assessment of all the vehicle's sensors, especially the critical ones. While each sensor can conduct specific post-accident tests and report its status individually, the evaluation module 303 can carry out additional tests and ways to report possible issues. For example, the evaluation module 303 can process the V2X communication information 205 from nearby vehicles, drones, and/or traffic cameras, to inspect the vehicle 101 and report to the vehicle 101, the system 100, the central server, and/or the cloud the results of its assessment. Such report may identify issues that the vehicle 101 itself might not be able to detect.

In one embodiment, the determining of the status of the one or more sensors, the one or more systems, or a combination thereof can be initiated based on detecting that the vehicle has been in an accident, that the one or more sensors, the one or more systems, or a combination thereof have malfunctioned, or a combination thereof. By way of example, the evaluation module 303 can monitor sensors, such as a crankshaft position sensor by testing voltage output and resistance then matching the results with the manufacturer specifications. A crankshaft position sensor continuously measures the rotational speed and position of the crankshaft, for the electronic control unit (ECU) to determine the timing of engine operations, such as fuel injection. When the crankshaft position sensor malfunctions or fails (e.g., due to a crash), the engine performs poorly (e.g., can only drive under 20 mph) or stalls (e.g., stop).

In another embodiment, the data processing module 301 working in conjunction with the evaluation module 303 can process data received from one or more devices (e.g., UEs 109), one or more other vehicles, or a combination thereof located within a proximity of the vehicle, and the status is determined or validated based on the data. For example, as mentioned, an autonomous vehicle uses a variety of techniques to detect their surroundings, such as radar, LiDAR, GPS, computer vision and advanced driver assistance systems (ADAS) and other sensors. The autonomous vehicle moves when the LiDAR sends the information to accelerate after determining the path is cleared, and the vehicle slows down or stops when the LiDAR sends the information to decelerate after determining an obstacle appears. When LiDAR and/or its sensors fail or malfunction, the vehicle configuration module 311 can take different approaches to continue driving with minimum LiDAR functions, or without using LiDAR at all.

For examples, the vehicle configuration module 311 can use the radar and/or the 3D camera to either replace or complement the damaged or malfunctioning LiDAR, to continue driving at the same speed or a lower speed, depending on the driving context and conditions, such as road geometry/conditions, traffic, weather, etc.

In another embodiment, in step 503, the map processing and routing module 309 can transmit a request for a map update based on the status of the one or more sensors, the one or more systems, or a combination thereof of the vehicle. For instance, the status indicates the one or more sensors, the one or more systems, or a combination thereof are damaged or malfunctioning For instance, the map processing and routing module 309 can select a map data layer type to request based on a sensor type of the damaged or malfunctioning one or more sensors, one or more systems, or a combination thereof. Each map data layer can be a collection of features organized into a searchable set of data that can be queried and included in making decisions. The map processing and routing module 309 can request only appropriate layer(s) to minimize data transfer. In one embodiment, in step 505, the map processing and routing module 309 can receive the map update in response to the request.

Figure 6:
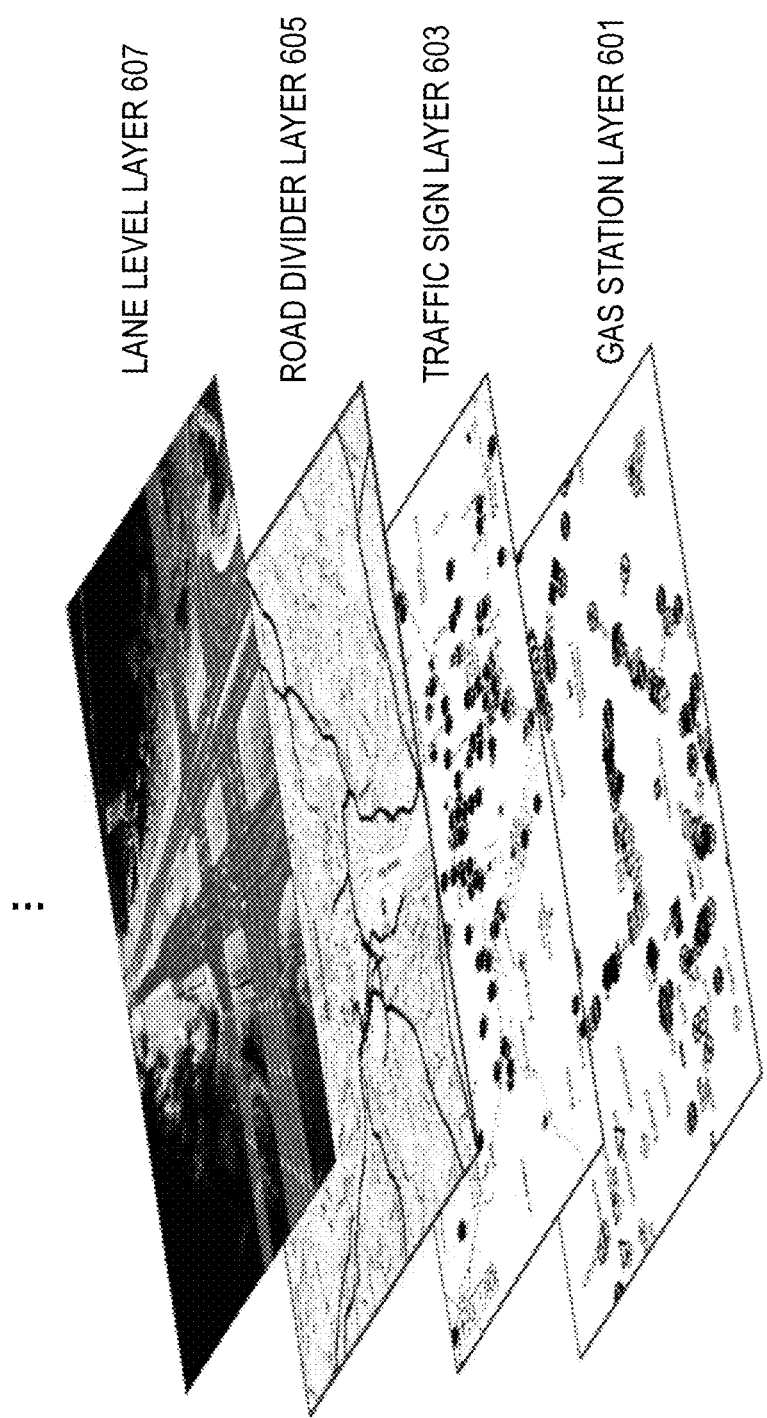
FIG. 6 is a diagram of example map layers, according to one or more example embodiments.

FIG. 6 is a diagram of example map layers, according to one or more example embodiments. For instance, the example map layers can include a gas station layer 601, a traffic sign layer 603, a road divider layer 605, a lane level layer 607, etc. FIG. 6 is illustrative in nature, and not restrictive. Other example map layers can include a live traffic layer, an accident map layer, a hazard warning layer, a weather layer, a cellular signal strength layer, a road geometry layer, a point of interest (POI) layer, a 3D content layer, a parking map layer, an electric vehicle charging station layer, a place footprint layer, etc.

Referring back to the LiDAR damaged or malfunctioning example, the map processing and routing module 309 can select one or more map data layers based on the manner and degree of damages or malfunctions of the LiDAR system and/or its components (e.g., a scanner, a laser, a GPS receiver, etc.), for example using the following Table 1 (O: optional, R: recommended, M: mandatory).

TABLE 1

| Malfunctions/Damages | Gas station layer | Traffic sign layer | Road divider layer | ... |
|---|---|---|---|---|
| LiDAR scanner malfunction | O | R | R | |
| LiDAR laser malfunction | O | R | R | |
| LiDAR GPS malfunction | O | O | O | |
| LiDAR computer malfunction | O | M | M | |
| ... | | | | |
| LiDAR scanner damaged | O | M | M | |
| LiDAR laser damaged | O | M | M | |
| LiDAR GPS damaged | O | M | M | |
| LiDAR computer damaged | O | M | M | |
| ... | | | | |

For instance, the gas station layer 601 can be optional to continue driving the vehicle when the LiDAR system of the vehicle or its components are malfunctioning and/or damaged. As another instance, when a LiDAR GPS is malfunctioning, the vehicle configuration module 311 can configure the LiDAR system to share vehicle location data from other systems and/or sensors (e.g., another GPS receiver), thus making the gas station layer 601, the traffic sign layer 603, the road divider layer 605, etc. optional. When the LiDAR scanner is malfunctioning (e.g., with a shorter than normal scanning range), the traffic sign layer 603 and the road divider layer 605 can be recommended for continuing driving the vehicle. On the other hand, when the LiDAR computer is malfunctioning or damaged, the traffic sign layer 603 and the road divider layer 605 can be mandatory for continuing driving the vehicle.

Table 1 is illustrative in nature, and not restrictive. Table 1 can be modified and/or expanded with more details (e.g., more systems/sensors) based on characteristics of the vehicle (e.g., model, age, maintenance records, etc.), characteristics of drivers/passengers (e.g., appointment/deliver schedules, comfort level preferences, etc.), driving context and conditions (e.g., road geometry/conditions, traffic, weather, etc.), etc.

In one embodiment, the evaluation module 303 can compute a probability (e.g., a score, a level such as high, medium, low, etc.) that the vehicle can drive within a target safety standard, a degraded state of the vehicle, or a combination thereof based on the status (e.g., normal, malfunctioning, damaged, etc.) of the one or more sensors, the one or more systems, or a combination thereof. The request for the map update can be based on the probability, the degraded state, or a combination thereof. By way of example, to calculate the probability (e.g., for each action element of the Table 1), the evaluation module 303 can consider factors, such as a location of the accident, autonomous vehicle data (e.g., sensor data), a location of an autonomous vehicle disengagement area, historical accident data, insights about the autonomous vehicle disengagement area (e.g., a number of cars per day, costs, etc.), road attributes (e.g., width, size, directionality, etc.), traffic, weather, mobility graphs (e.g., of the vehicle, passengers, etc.).

In one embodiment, a safe driving probability and elements machine learning model can be built by the machine learning system 113 based on accident/malfunction types, contextual attributes (e.g., a vehicle model, a travel speed, historical travel data, traffic data, calendar data, etc.) associated with the vehicle, passenger(s), timing attributes, etc. as training data. By way of example, the machine learning system 113 can determine elements (e.g., a speed, map update(s), etc.) for the malfunctioning/damaged vehicle to continue safe driving based on parameters/factors such as characteristics of the vehicle (e.g., model, age, maintenance records, etc.), characteristics of drivers/passengers (e.g., appointment/deliver schedules, comfort level preferences, etc.), driving context and conditions (e.g., road geometry/conditions, traffic, weather, etc.), map data, etc. that describe a distribution or a set of distributions of the accident, thereby calculating cause(s) of the accident (with a respective accident type, a respective accident severity, etc.) as reported from various sources, such as government/municipality agencies, local or community agencies (e.g., a police department), and/or third-party official/semi-official sources.

In another embodiment, the machine learning system 113 can select respective weights of the parameters/factors, and/or various traffic incident information sources, for example, based on their respective reliability. In another embodiment, the machine learning system 113 can further select or assign respective correlations, relationships, etc. among the traffic incident information sources, for determining a confidence level for the malfunctioning/damaged vehicle 101 to continue driving safely. In one instance, the machine learning system 113 can continuously provide and/or update the safe driving probability and elements machine learning model using, for instance, a support vector machine (SVM), neural network, decision tree, etc.

In one embodiment, the evaluation module 303 can determine at recommended action for the vehicle based on the probability, the degraded state, or a combination thereof. By way of examples, the recommended action includes at least one of: (1) stopping an operation of the vehicle; (2) continuing the operation of the vehicle without passengers until the vehicle reaches a next location or destination; and (3) continuing the operation of the vehicle with at least one passenger until the vehicle reaches the next location or destination. For instance, the next location or destination is a vehicle repair facility.

By way of example, the evaluation module 303 can consider general and/or specific context/factors to decide whether the vehicle should stop or continue driving. For instance, the general context may include safer for the vehicle passengers to keep riding in a malfunctioning/damaged vehicle or to wait for a replacement vehicle along the highway? When the answer is yes, then the vehicle should take the passengers to the next safe place (e.g., at the next highway exit) and leave them there. In the meantime, the request for a new vehicle will secure a safe vehicle already waiting for them at the next highway exit. However, the evaluation module 303 can make a different decision for the passengers in a residential area. As another instance, the specific route context of the journey can play a role in making the decision to keep driving the malfunctioning/damaged vehicle or not. For instance, the proximity of an origin or a destination could motivate the passengers to either finish on foot, or come back to the origin and chose a different transport mode.

In one embodiment, in case of a privately owned autonomous vehicle, the control and decision loop may involve the vehicle owner more, such as querying what the owner wants to do now: to get a replacement autonomous vehicle, to pick the passenger(s) up, to choose an alternate transport mode, etc. While in case of an autonomous vehicle fleet, the system 100 may take control itself, such as an automatic dispatching a replacement autonomous vehicle in case of an accident based on the fleet's safety guidelines.

In one embodiment, in step 507, the vehicle configuration module 311 can configure at least one system of the vehicle to operate using the map update. By way of example, the vehicle configuration module 311 can use the map update (e.g., one or more of the map layers in FIG. 6) to supplement or replace sensor data from the damaged or malfunctioning one or more sensors, one or more systems, or a combination thereof during an operation of the vehicle. For instance, the one or more sensors include a camera sensor, and the selected map data layer type is a map layer of traffic signs (e.g., the traffic sign layer 603). As another instance, the one or more sensors include a radar sensor, a LiDAR sensor, or a combination thereof, and the selected map data layer type is a map layer of physical obstacles (e.g., the road divider layer 605).

In one embodiment, when determining that the map update is not available (e.g., map updates to be constructed for an existing area or for a newly developed area, access to map updates to be acquired for the vehicle, etc.) in response to the request, the vehicle configuration module 311 can initiate a re-routing of the vehicle. For examples, the re-routing of the vehicle enables the vehicle to perform at least one of: (1) avoiding an area, a route, or a combination for which the map update is not available; and (2) routing through another area, another route, or a combination thereof that enables the vehicle to use the one or more sensors, the one or more systems, or a combination thereof under the status (e.g., a LiDAR scanner with a shorter than normal range, a damaged LiDAR GPS receiver, etc.).

Figure 7:
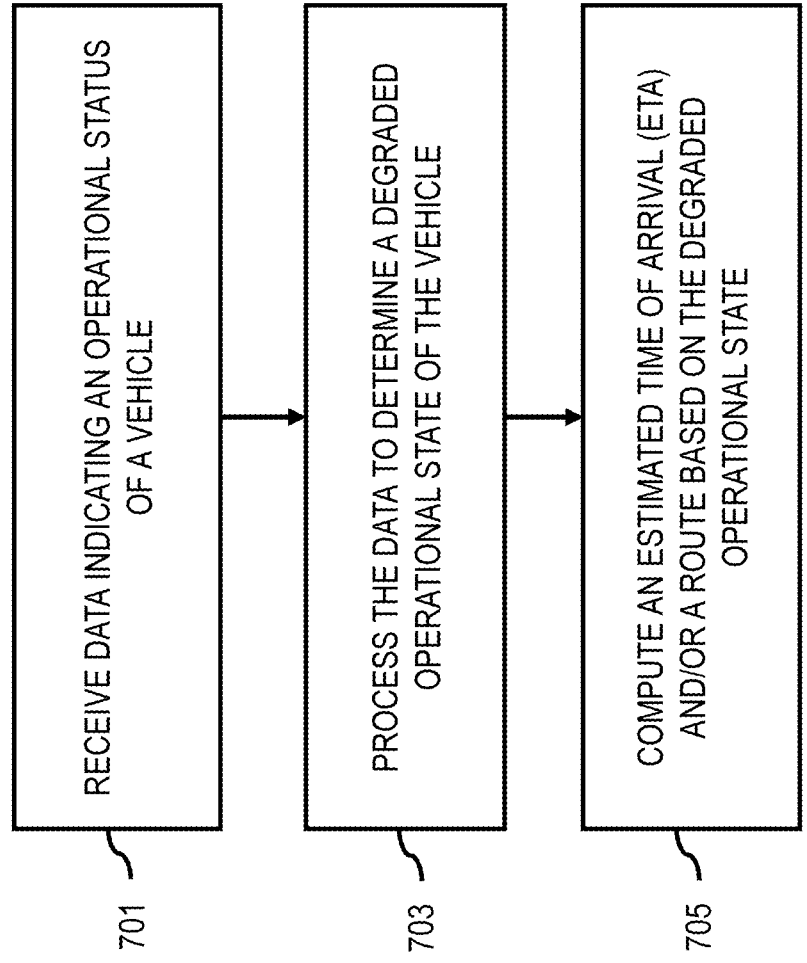
FIG. 7 is a flowchart for re-routing and/or estimating a time of arrival (ETA) for a vehicle based on a degraded operational state, according to one or more example embodiments.

FIG. 7 is a flowchart for re-routing and/or estimating a time of arrival (ETA) for a vehicle based on a degraded operational state, according to one or more example embodiments. In various embodiments, the navigation platform 105, the machine learning system 113, and/or any of the modules 301-313 may perform one or more portions of the process 700 and may be implemented in, for instance, a chip set including a processor and a memory as shown in FIG. 11. As such, the navigation platform 105 and/or the modules 301-313 can provide means for accomplishing various parts of the process 700, as well as means for accomplishing embodiments of other processes described herein in conjunction with other components of the system 100. The steps of the process 700 can be performed by any feasible entity, such as the navigation platform 105, the modules 301-313, etc. Although the process 700 is illustrated and described as a sequence of steps, its contemplated that various embodiments of the process 700 may be performed in any order or combination and need not include all the illustrated steps.

In one embodiment, in step 701, the data processing module 301 can receive data indicating an operational status of a vehicle. By way of example, the vehicle is an autonomous vehicle, and the operational status relates to one or more sensors of the vehicle used for autonomous driving.

In one embodiment, in step 703, the evaluation module 303 can process the data to determine a degraded operational state of the vehicle. By way of examples, the degraded operational state may be continue driving with passenger(s) until the next safe stop, continue driving without passenger(s) until a repair facility, continue driving with passenger(s) until a destination, continue driving without passenger(s) until a destination, etc.

For instance, the receiving of the data is initiated based on detecting at least one of: (1) the vehicle has been involved in an accident (e.g., the accident 211), one or more sensors of the vehicle has been damaged due to the accident; or (2) one or more sensors of the vehicle has been damaged, malfunctioned (e.g., the malfunction 207), or obstructed.

In one embodiment, in step 705, the map processing and routing module 309 can compute an estimated time of arrival (ETA), a route, or a combination thereof of the vehicle based on the degraded operational state. By way of example, once the sensor data of the vehicle have been assessed as in a degraded operational state and the decision has been made that the vehicle is allowed to keep driving, the map processing and routing module 309 can evaluate what the impact on ETA will be, based on the duration of the accident, the process of evaluation of the vehicle's damages, as well as the impact of the degraded operational state in which it is allowed to carry on with, e.g., a speed not exceeding 30 mph.

In another embodiment, the map processing and routing module 309 can initiate a request for a map update (e.g., one or more map layers of FIG. 6, a new route and relevant map data, etc.) based on the degraded operational state, and the ETA, the route, or a combination thereof is computed further based on the map update. By way of example, the map processing and routing module 309 can calculate what the impact on ETA will be, based on the impact of driving using the one or more map layers of FIG. 6, the new route and relevant map data, etc.

In one embodiment, the evaluation module 303 can determine a sensor range of one or more sensors of the vehicle based on the degraded operational state, and compute a recommended speed of the vehicle based on the sensor range, and the ETA, the route, or a combination thereof is computed further based on the recommended speed. By way of example, the recommended speed is determined based on a table (e.g., Table 2, "X"=spend zero) correlating vehicle damage to vehicle speed.

TABLE 2

| Damage/malfunction | Urban highway | Rural highway | Residential road | ... |
|---|---|---|---|---|
| Camera damaged | 35 | 40 | 20 | |
| GPS damaged | 40 | 55 | 15 | |
| LiDAR damaged | 45 | 60 | 70 | |
| Radar damaged | 45 | 60 | 20 | |
| Brake damaged | X | X | X | |
| ... | | | | |
| Camera malfunction | 50 | 55 | 75 | |
| GPS malfunction | 55 | 70 | 30 | |
| LiDAR malfunction | 55 | 70 | 30 | |
| Brake malfunction | X | X | 5 | |
| ... | | | | |

For instance, when the brake is damaged, the vehicle should stop (i.e., zero speed at as shoulder regardless it is on an urban highway, rural highway, residential road, etc. On the other hand, when the brake is malfunctioning, the vehicle should stop on an urban or rural highway, yet drive at 5 mph on a residential road. As another instance, when a LiDAR is malfunctioning, the vehicle configuration module 311 can configure the LiDAR to share vehicle location data from other systems and/or sensors (e.g., another GPS receiver), such that the vehicle can drive at the normal speed limits on urban highway, rural highway, residential road, etc. On the other hand, when a LiDAR is damaged, the vehicle configuration module 311 can configure the vehicle to rely on object detecting systems (e.g., 3D camera, radar, etc.), such that the vehicle can drive slower than the normal speed limits on urban highway, rural highway, residential road, etc. When the allowed speed is low (e.g., 30 mph), the user may prefer to wait for a replacement autonomous vehicle that would reduce the impact on the ETA due to its ability to drive 75 mph on the highway. A replacement autonomous vehicle and/or a towing vehicle can be ordered by the autonomous vehicle fleet operator after the automated analysis of the accident (e.g., based on the company's safety guidelines), or the autonomous vehicle after self-assessment, by an owner, operator, or passenger of the autonomous vehicle who do not feel safe continuing in such vehicle, etc.

Table 2 is illustrative in nature, and not restrictive. Table 2 can be modified and/or expanded with more details (e.g., more systems/sensors) based on characteristics of the vehicle (e.g., model, age, maintenance records, etc.), characteristics of drivers/passengers (e.g., appointment/deliver schedules, comfort level preferences, etc.), driving context and conditions (e.g., road geometry/conditions, traffic, weather, etc.), etc. Historically, 30 mph speed limit in built up areas was introduced in 1956, while the 70 mph speed limit was introduced for motorways in 1965. The speeds can be determined considering current vehicle technologies. For example, autonomous vehicles automatically recalibrate higher speeds and an amount of true stopping distance will require.

As another example, the ETA, the route, or a combination thereof is computed to avoid one or more roads based on the degraded operational state of the vehicle. As yet another example, the ETA, the route, or a combination thereof is computed to increase a proximity to one or more vehicle service facilities based on the degraded operational state of the vehicle.

In another embodiment, the ETA, the route, or a combination thereof is computed based on a multi-modal route comprising a plurality of modes of transport (e.g., walking, bicycle, other shared vehicle, bus, etc.) based on the degraded operational state of the vehicle.

In another embodiment, the vehicle is an autonomous vehicle, and the evaluation module 303 can compute a maximum autonomy level (e.g., Level 2 ("hands off"), Level 3 ("eyes off"), Level 4 ("mind off"), and Level 5 ("steering wheel optional")) of the vehicle based on the degraded operational state, while the ETA, the route, or a combination thereof is further based on the maximum autonomy level.

In another embodiment, the evaluation module 303 can determine that a new vehicle is recommended in place of the vehicle based on the degraded operational state, and the ETA, the route, or a combination thereof is further computed based on replacing the vehicle with the new vehicle.

In one embodiment, the presentation module 313 can present the ETA, the route, or a combination thereof as an isoline representation in a user interface of a device.

The above-discussed embodiments allows autonomous vehicles to evaluate their own malfunctions and/or damages (e.g., accidents) as well as their ability to continue driving by analyzing sensor statuses and/or accident characteristics, thus limiting impacts on the passenger's journey (such as an estimated time of arrival using the same or replacement vehicle).

The above-discussed embodiments determine how autonomous vehicles handle the situations in which they are malfunctioning and/or involved in an accident, such as stopping or continue driving with or without passenger(s) and until the next safe stop or the destination, and keeps improving its evaluations and predictions via machine learning.

FIGS. 8A-8D are diagrams of example user interfaces utilized in the processes of FIGS. 4-7, according to multiple embodiments. These interfaces are examples of possible interfaces that may be compatible with the system 100 as described in FIGS. 1-7, and which may include such options as selection menus of, for example, vehicle profile details, information on road network, options related to control of the vehicle, such as autonomous relative to manual under various conditions, and other like options may be included. Such options may further include selection menus of, for example, malfunction and accident statistics, driving behavior statistics, points of interest information, passenger comfort riding data, etc.

Figure 8A:
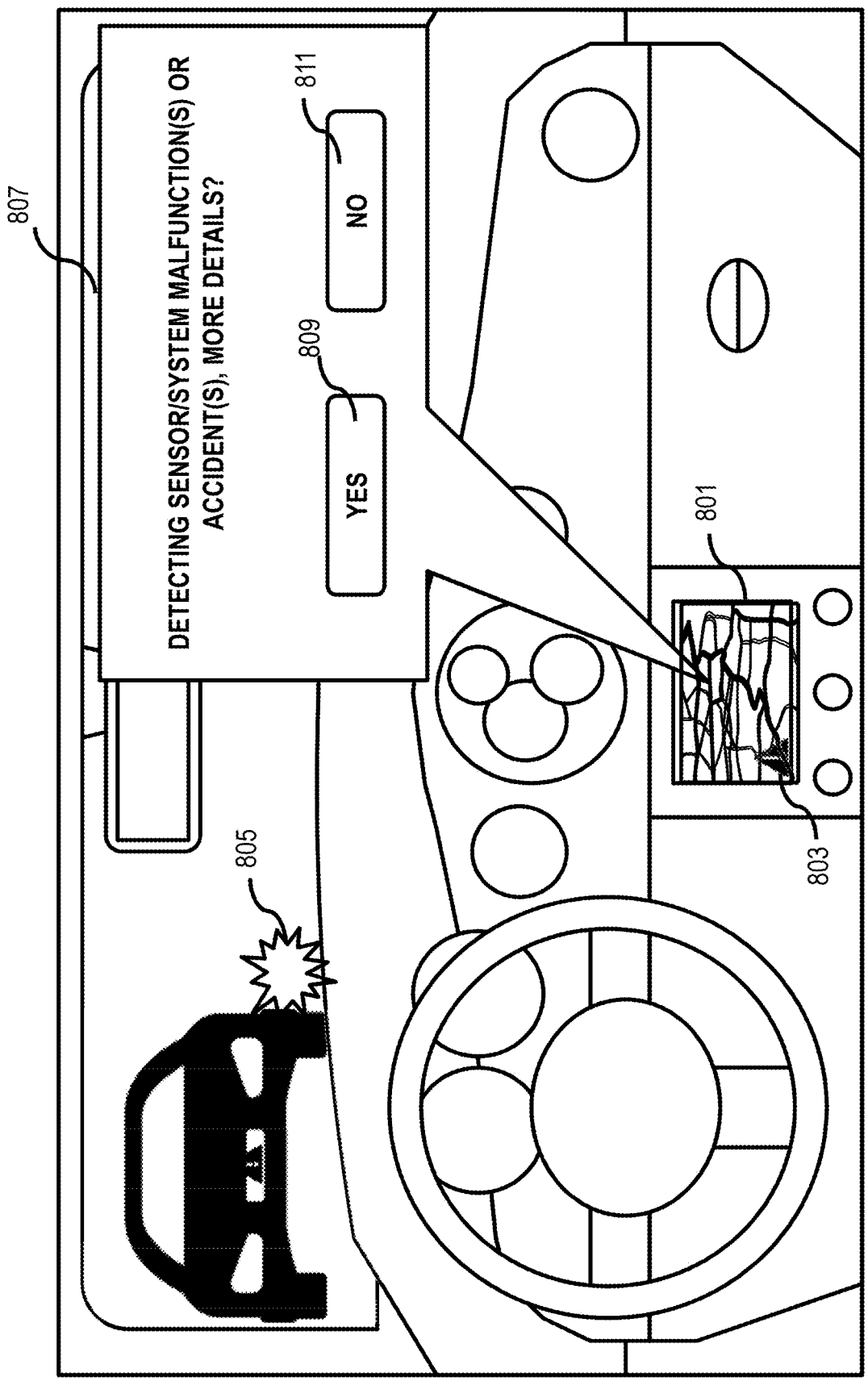
FIGS. 8A-8D are diagrams of example user interfaces utilized in the processes of FIGS. 4-7, according to one or more example embodiments.

FIG. 8A is a diagram that represents alerting conditions for a vehicle 101, according to one or more example embodiments. In one scenario, a user interface 801 of the vehicle 101 depicts a sensor/system malfunction 803 and or an accident 805, and prompts the user with a popup 807: "Detecting sensor/system malfunction(s) or accident(s), more details?" An operator and/or a passenger of the vehicle 101 can select a "yes" button 809 or a "no" button 811.

Figure 8B:
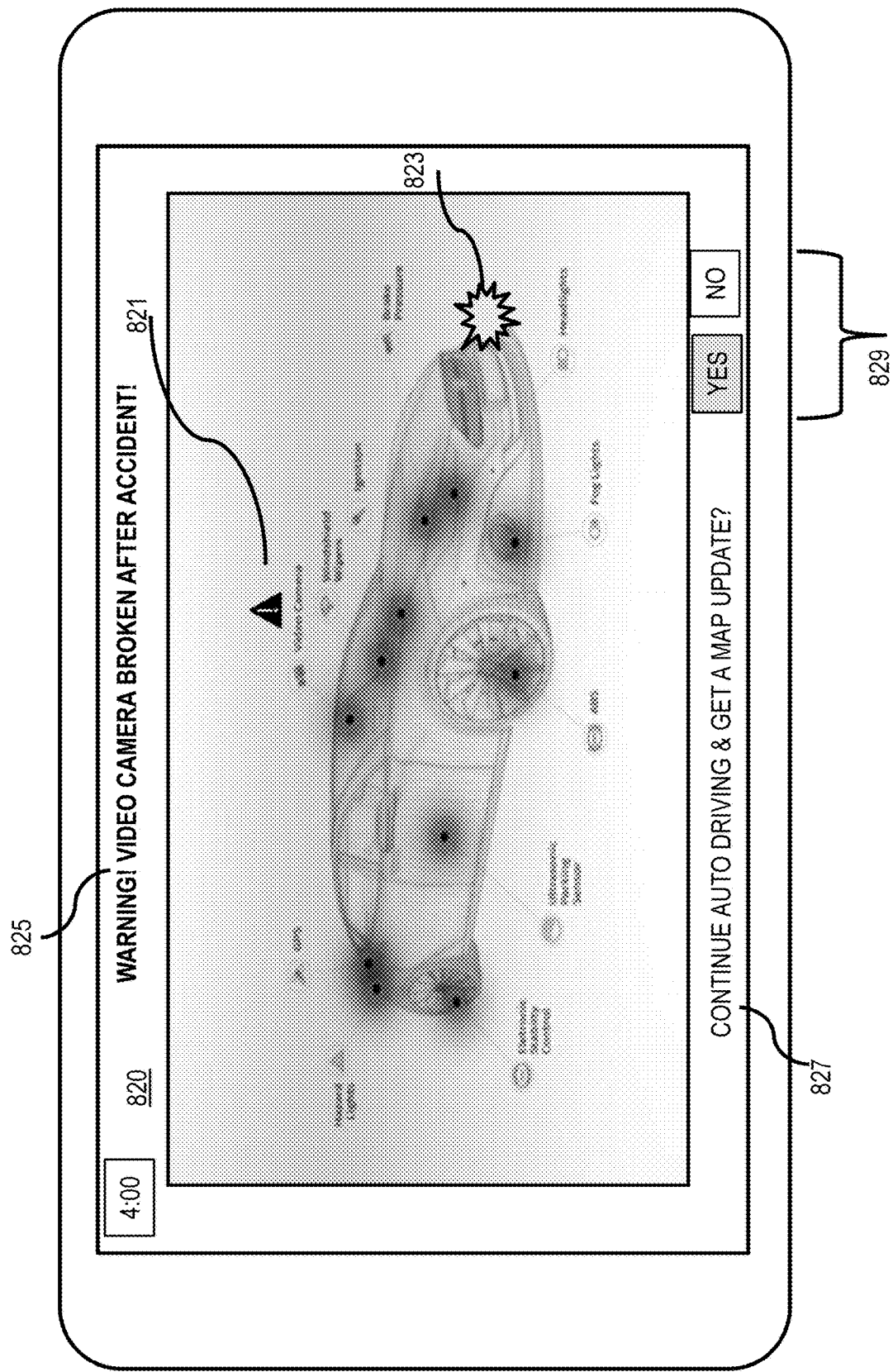

After the "yes" button 809 in FIG. 8A is selected, the system 100 can display the details of sensor/system malfunction(s) or accident(s). FIG. 8B is a diagram of a user interface that presents malfunction and accident details, according to one or more example embodiments. The user interface 820 shows a perspective view of the vehicle 101 with a malfunction tag 821 next to the video camera, and an accident tag 823 next to the front bumper. The user interface 820 also shows a notification 825 of "Warning! Video camera broken after accident!", a prompt 827: "Continue AUTO driving & get a map update?", and "yes" and "no" buttons 829.

Figure 8C:
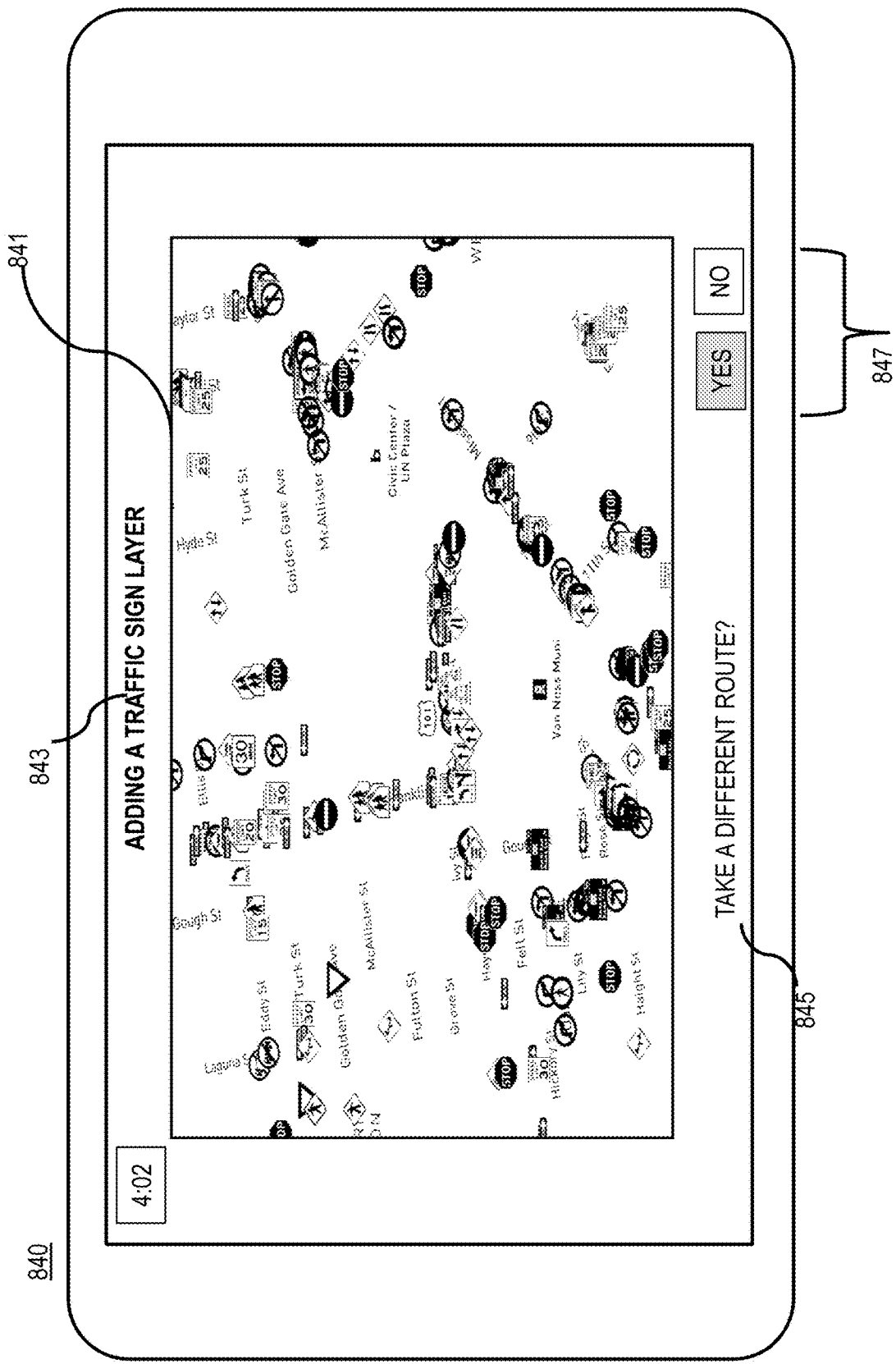

After the "yes" button in FIG. 8B is selected, the system 100 can display map update(s). FIG. 8C is a diagram of a user interface that presents map update(s) overlaid on a map, according to one or more example embodiments. The user interface 840 overlays a traffic sign layer 841 on a map. The user interface 840 also shows a notification 843 of "Adding a traffic sign layer." When the video camera is broken, the traffic sign layer 841 can be recommended for continuing driving the vehicle. The user interface 840 further shows a prompt 845: "Take a different route?", and "yes" and "no" buttons 847.

Figure 8D:
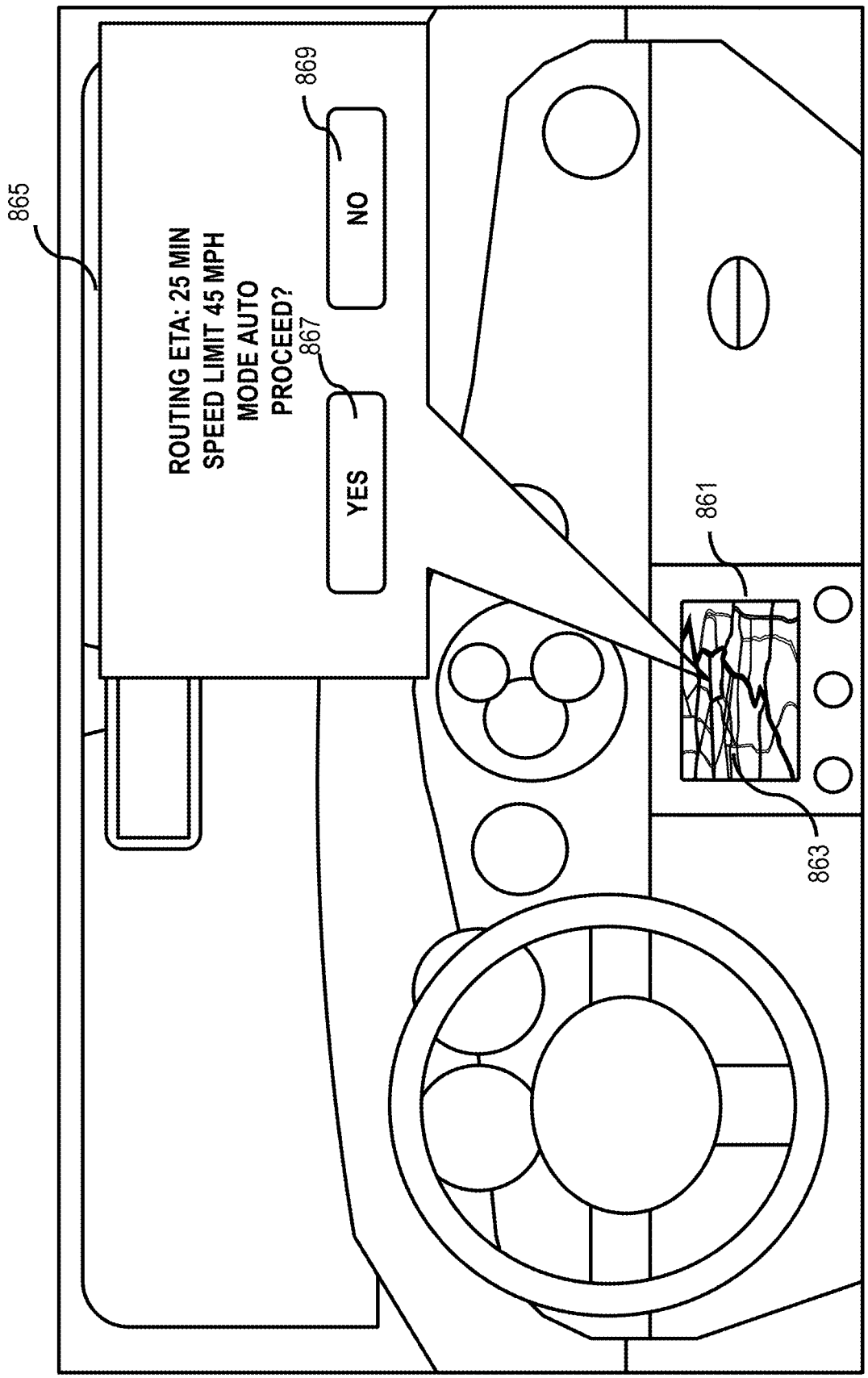

After the "yes" button in FIG. 8C is selected, the system 100 can display a new route. FIG. 8D is a diagram that represents rerouting of the vehicle 101, according to one or more example embodiments. In one scenario, a user interface 861 of the vehicle 101 depicts a new route 863 on the map, and prompts the user with a popup 865: "Rerouting ETA: 25 min, speed limit 45 mph, mode auto, proceed?" An operator and/or a passenger of the vehicle 101 can select a "yes" button 867 or a "no" button 869 to continue to a destination of the vehicle 101 via the new route.

The user interfaces and/or user selections in FIGS. 8A-8D are optional, since the system 100 can automatically make these selections for an autonomous vehicle based on the above-discussed sensor data.

Returning to FIG. 1, in one embodiment, the navigation platform 105 has connectivity over the communication network 107 to the services platform 117 (e.g., an OEM platform) that provides services 119 (e.g., probe and/or sensor data collection services). By way of example, the services 119 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 117 uses the output (e.g. lane-level dangerous slowdown event detection and messages) of the navigation platform 105 to provide services such as navigation, mapping, other location-based services, etc.

In one embodiment, the navigation platform 105 may be a platform with multiple interconnected components. The navigation platform 105 may include multiple servers, intelligent networking devices, computing devices, components, and corresponding software for providing parametric representations of lane lines. In addition, it is noted that the navigation platform 105 may be a separate entity of the system 100, a part of the services platform 117, a part of the one or more services 119, or included within the vehicles 101 (e.g., an embedded navigation system).

In one embodiment, content providers 121 may provide content or data (e.g., including probe data, sensor data, etc.) to the navigation platform 105, the UEs 109, the applications 111, the geographic database 115, the services platform 117, the services 119, and the vehicles 101. The content provided may be any type of content, such as map content, textual content, audio content, video content, image content, etc. In one embodiment, the content providers 121 may provide content that may aid in localizing a vehicle path or trajectory on a lane of a digital map or link. In one embodiment, the content providers 121 may also store content associated with the navigation platform 105, the geographic database 115, the services platform 117, the services 119, and/or the vehicles 101. In another embodiment, the content providers 121 may manage access to a central repository of data, and offer a consistent, standard interface to data, such as a repository of the geographic database 115.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the navigation platform 105 to provide hybrid traffic incident identification.

In one embodiment, as mentioned above, the vehicles 101, for instance, are part of a probe-based system for collecting probe data and/or sensor data for detecting traffic incidents (e.g., dangerous slowdown events) and/or measuring traffic conditions in a road network. In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 103 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the navigation platform 105. The probe points also can be map matched to specific road links stored in the geographic database 115. In one embodiment, the system 100 (e.g., via the navigation platform 105) can generate probe traces (e.g., vehicle paths or trajectories) from the probe points for an individual probe so that the probe traces represent a travel trajectory or vehicle path of the probe through the road network.

In one embodiment, as previously stated, the vehicles 101 are configured with various sensors (e.g., vehicle sensors 103) for generating or collecting probe data, sensor data, related geographic/map data, etc. In one embodiment, the sensed data represents sensor data associated with a geographic location or coordinates at which the sensor data was collected. By way of example, the vehicle sensors 103 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travel through road segments of a road network.

Other examples of sensors 103 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel (e.g., while on a hill or a cliff), moisture sensors, pressure sensors, etc. In a further example embodiment, sensors 103 about the perimeter of the vehicle 101 may detect the relative distance of the vehicle 101 from a physical divider, a lane line of a link or roadway, the presence of other vehicles, pedestrians, traffic lights, potholes and any other objects, or a combination thereof. In one scenario, the vehicle sensors 103 may detect weather data, traffic information, or a combination thereof. In one embodiment, the vehicles 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, other vehicles, conditions regarding the driving environment or roadway, etc. For example, such sensors may be used as GPS receivers for interacting with the one or more satellites 123 to determine and track the current speed, position, and location of a vehicle 101 travelling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the navigation platform 105 retrieves aggregated probe points gathered and/or generated by the vehicle sensors 103 and/or the UE 109 resulting from the travel of the UEs 109 and/or vehicles 101 on a road segment of a road network. In one instance, the geographic database 115 stores a plurality of probe points and/or trajectories generated by different vehicle sensors 103, UEs 109, applications 111, vehicles 101, etc. over a period while traveling in a monitored area. A time sequence of probe points specifies a trajectory—i.e., a path traversed by a UE 109, application 111, vehicle 101, etc. over the period.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 103, navigation platform 105, UEs 109, applications 111, services platform 117, services 119, content providers 121, and/or satellites 123 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for evaluating, reporting, and handling an autonomous vehicle involving an accident and/or malfunction may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
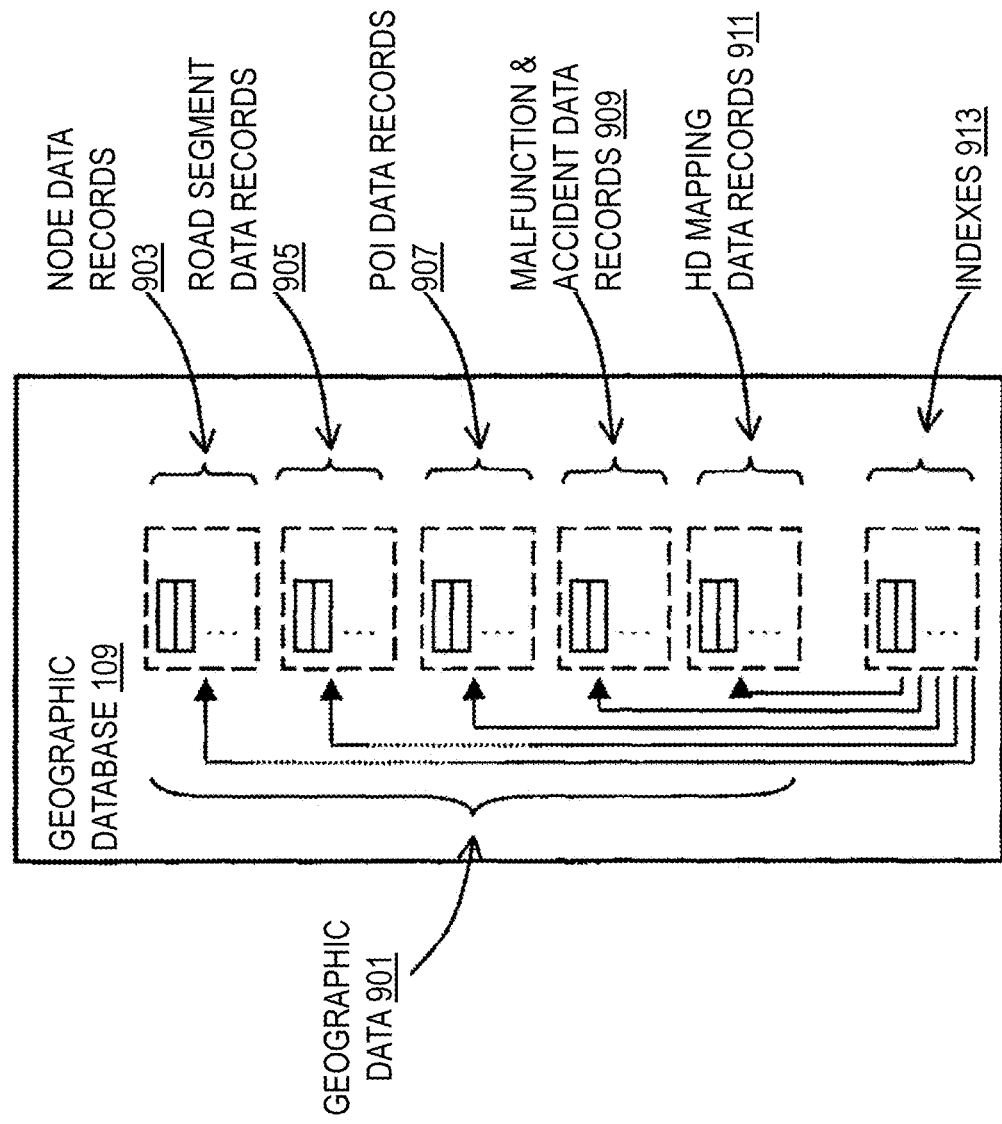
FIG. 9 is a diagram of a geographic database, according to one embodiment.

FIG. 9 is a diagram of a geographic database (such as the database 115), according to one embodiment. In one embodiment, the geographic database 115 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on LiDAR or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 903, road segment or link data records 905, POI data records 907, malfunction and accident data records 909, HD mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 115. In one embodiment, the indexes 913 may be used to quickly locate data without having to search every row in the geographic database 115 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 907. The geographic database 115 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 115 can also include malfunction and accident data records 909 for storing malfunction data, accident data, map and accident association data, training data, prediction models, annotated observations, computed featured distributions, sampling probabilities, and/or any other data generated or used by the system 100 according to the various embodiments described herein. By way of example, the malfunction and accident data records 909 can be associated with one or more of the node records 903, road segment records 905, and/or POI data records 907 to support localization or visual odometry based on the features stored therein and the corresponding estimated quality of the features. In this way, the records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 121 in association with the services platform 117 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 101 and/or user terminals 109) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a user terminal 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

Figure 10:
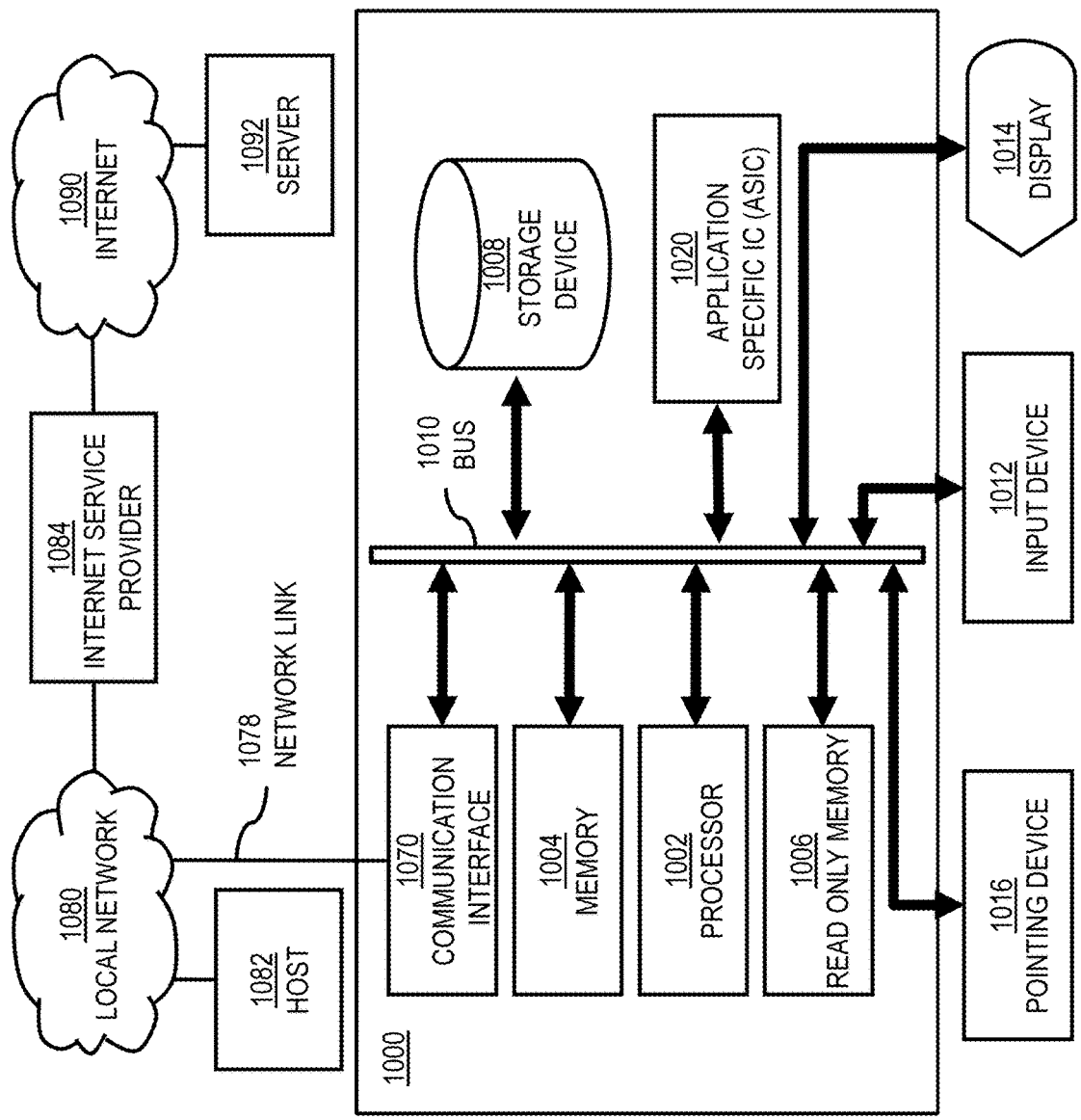
FIG. 10 is a diagram of hardware that can be used to implement an embodiment of the invention, according to one or more example embodiments.

FIG. 10 illustrates a computer system 1000 upon which an embodiment of the invention may be implemented. Computer system 1000 is programmed (e.g., via computer program code or instructions) to evaluate, report, and handle an autonomous vehicle involving an accident and/or malfunction as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to evaluating, reporting, and handling an autonomous vehicle involving an accident and/or malfunction. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for evaluating, reporting, and handling an autonomous vehicle involving an accident and/or malfunction. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk, or flash card, for storing information, including instructions, that persists even when the computer system 1000 is turned off or otherwise loses power.

Information, including instructions for evaluating, reporting, and handling an autonomous vehicle involving an accident and/or malfunction, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners, and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for evaluating, reporting, and handling an autonomous vehicle involving an accident and/or malfunction to the navigation platform 105, the UEs 109, etc.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to evaluate, report, and handle an autonomous vehicle involving an accident and/or malfunction as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to evaluate, report, and handle an autonomous vehicle involving an accident and/or malfunction. The memory 1105 also stores the data associated with or generated by the execution of the inventive steps.

Figure 12:
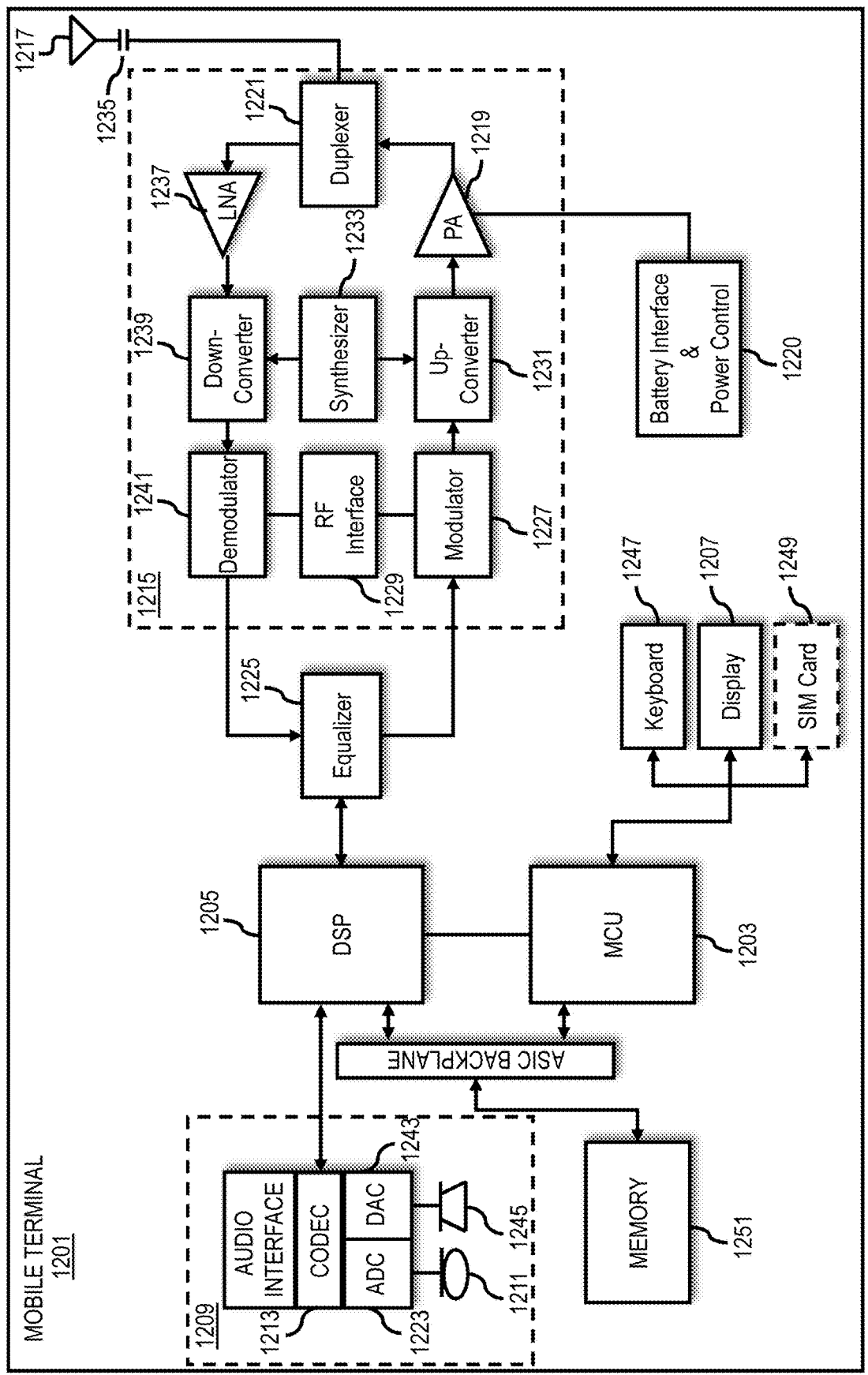
FIG. 12 is a diagram of a mobile terminal (e.g., handset) that can be used to implement an embodiment of the invention.

FIG. 12 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to evaluate, report, and handle an autonomous vehicle involving an accident and/or malfunction. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, information such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by one or more processors, that a vehicle was involved in an accident;
   receiving, by the one or more processors, a report indicating map data configured in the vehicle at a time of the accident;
   determining, by the one or more processors, an association between the configured map data and the accident; and
   performing, by the one or more processors, one or more of the following operations:
   (i) transmitting the association, at least a portion of the configured map data, or a combination thereof to a database, a computing device, or a combination thereof; or
   (ii) determining at least one map change to the configured map data based on the determined association, and transmitting the at least one map change to the vehicle, at least one other vehicle, the database, the computing device, or a combination thereof.

2. The method of claim 1, wherein the at least one map change is determined based on the at least one map change reducing a probability of an occurrence of a subsequent accident.

3. The method of claim 1, further comprising:
receiving sensor data from the vehicle, the at least one other vehicle, at least one infrastructure sensor, or a combination thereof;
processing the sensor data to determine at least one sensed attribute of a road link, a map feature, or a combination thereof associated with a location of the accident; and
comparing the at least one sensed attribute against at least one mapped attribute of the road link, the map feature, or a combination thereof to determine the at least one map change.

4. The method of claim 3, further comprising:
determining that the at least one sensed attribute is missing from the configured map data based on the comparing,
wherein the at least one map change includes adding the at least one sensed attribute.

5. The method of claim 1, further comprising:
determining a version number of the configured map data and a current version number of the database,
wherein the at least one map change includes an update to the configured map data to the current version number.

6. The method of claim 1, further comprising:
receiving data indicating at least one disengagement of an autonomous driving mode of the vehicle, the at least one other vehicle, or a combination thereof,
wherein the association between the configured map data and the accident is further based on the at least one disengagement of the autonomous driving mode.

7. The method of claim 6, wherein the data further indicates that the at least one disengagement of the autonomous driving mode was requested by an autonomous system of the vehicle, the least one other vehicle, or a combination thereof but the at least one disengagement was unsuccessful.

8. The method of claim 1, wherein the at least one map change includes a change to one or more map layers, one or more stored map features, or a combination thereof of the database.

9. The method of claim 1, wherein the association between the configured map data and the accident is based on a statistical analysis of the accident, historical accident data, or a combination thereof.

10. The method of claim 1, wherein the report further specifies one or more characteristics of the accident, and wherein the association between the configured map data and the accident, the at least one map change, or a combination thereof is further based on the one or more characteristics.

11. An apparatus comprising:
at least one processor; and
at least one memory including computer program code for one or more programs,
the at least one memory and the computer program code configured to, with the at least one processor, cause the apparatus to perform at least the following,
determine that a vehicle was involved in an accident;
receive a report indicating map data configured in the vehicle at a time of the accident;
determine an association between the configured map data and the accident; and
perform one or more of the following operations:
(i) transmitting the association, at least a portion of the configured map data, or a combination thereof to a database, a computing device, or a combination thereof; or
(ii) determining at least one map change to the configured map data based on the determined association, and transmitting the at least one map change to the vehicle, at least one other vehicle, the database, the computing device, or a combination thereof.

12. The apparatus of claim 11, wherein the at least one map change is determined based on the at least one map change reducing a probability of an occurrence of a subsequent accident.

13. The apparatus of claim 11, wherein the apparatus is further caused to:
receive sensor data from the vehicle, the at least one other vehicle, at least one infrastructure sensor, or a combination thereof;
process the sensor data to determine at least one sensed attribute of a road link, a map feature, or a combination thereof associated with a location of the accident; and
compare the at least one sensed attribute against at least one mapped attribute of the road link, the map feature, or a combination thereof to determine the at least one map change.

14. The apparatus of claim 13, wherein the apparatus is further caused to:
determine that the at least one sensed attribute is missing from the configured map data based on the comparing,
wherein the at least one map change includes adding the at least one sensed attribute.

15. The apparatus of claim 11, wherein the apparatus is further caused to:
determine a version number of the configured map data and a current version number of the database,
wherein the at least one map change includes an update to the configured map data to the current version number.

16. The apparatus of claim 11, wherein the apparatus is further caused to:
receive data indicating at least one disengagement of an autonomous driving mode of the vehicle, the at least one other vehicle, or a combination thereof,
wherein the association between the configured map data and the accident is further based on the at least one disengagement of the autonomous driving mode.

17. The apparatus of claim 16, wherein the data further indicates that the at least one disengagement of the autonomous driving mode was requested by an autonomous system of the vehicle, the least one other vehicle, or a combination thereof but the at least one disengagement was unsuccessful.

18. A non-transitory computer-readable storage medium carrying one or more sequences of one or more instructions which, when executed by one or more processors, cause an apparatus to perform:
determining that a vehicle was involved in an accident;
receiving a report indicating map data configured in the vehicle at a time of the accident;
determining an association between the configured map data and the accident; and
performing one or more of the following operations:
(i) transmitting the association, at least a portion of the configured map data, or a combination thereof to a database, a computing device, or a combination thereof; or (ii) determining at least one map change to the configured map data based on the determined association, and transmitting the at least one map change to the vehicle, at least one other vehicle, the database, the computing device, or a combination thereof.

19. The non-transitory computer-readable storage medium of claim 18, wherein the at least one map change is determined based on the at least one map change reducing a probability of an occurrence of a subsequent accident.

20. The non-transitory computer-readable storage medium of claim 18, wherein the apparatus is caused to further perform:
   receiving sensor data from the vehicle, the at least one other vehicle, at least one infrastructure sensor, or a combination thereof;
   processing the sensor data to determine at least one sensed attribute of a road link, a map feature, or a combination thereof associated with a location of the accident; and
   comparing the at least one sensed attribute against at least one mapped attribute of the road link, the map feature, or a combination thereof to determine the at least one map change.

* * * * *